United States Patent
Chen et al.

(10) Patent No.: US 12,483,326 B2
(45) Date of Patent: Nov. 25, 2025

(54) WIRELESS COMMUNICATION METHOD AND APPARATUS

(71) Applicant: HUAWEI TECHNOLOGIES CO., LTD., Guangdong (CN)

(72) Inventors: Ying Chen, Hangzhou (CN); Xueliang Shi, Hangzhou (CN); Yunfei Qiao, Hangzhou (CN); Jun Wang, Hangzhou (CN); Yu Wang, Hangzhou (CN); Hejia Luo, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 291 days.

(21) Appl. No.: 18/221,137

(22) Filed: Jul. 12, 2023

(65) Prior Publication Data

US 2023/0353237 A1    Nov. 2, 2023

Related U.S. Application Data

(63) Continuation of application No. PCT/CN2022/072394, filed on Jan. 17, 2022.

(30) Foreign Application Priority Data

Jan. 15, 2021  (CN) .......................... 202110057973.9

(51) Int. Cl.
*H04B 7/185* (2006.01)
*H04B 7/204* (2006.01)
*H04W 28/02* (2009.01)

(52) U.S. Cl.
CPC ....... *H04B 7/18545* (2013.01); *H04B 7/2041* (2013.01); *H04W 28/0226* (2013.01)

(58) Field of Classification Search
CPC .............. H04B 7/18545; H04B 7/2041; H04B 7/18513; H04B 7/1851; H04B 7/18519;
(Continued)

(56) References Cited

U.S. PATENT DOCUMENTS 7,606,567 B1 * 10/2009 Katz .................. H04B 7/18513
                                                          455/452.2
2003/0092380 A1 * 5/2003 Soliman ................. H01Q 1/246
                                                          455/12.1
(Continued)

*Primary Examiner* — Nimesh Patel
(74) *Attorney, Agent, or Firm* — WOMBLE BOND DICKINSON (US) LLP

(57) ABSTRACT

A first communication apparatus obtains first ephemeris information of a second communication apparatus, where the first ephemeris information includes information about m parameters of n parameters in second ephemeris information, n is equal to 6, and m is a positive integer less than n, and the n parameters include a first location parameter, a first location parameter, and a first location parameter in first location information, and a first velocity parameter, a first velocity parameter, and a first velocity parameter in first velocity information. The first communication apparatus determines values of the n parameters in the second ephemeris information based on the first ephemeris information, where the values of the n parameters include values of the m parameters and values of remaining n–m parameters. The first communication apparatus communicates with the second communication apparatus based on the second ephemeris information.

20 Claims, 11 Drawing Sheets

(58) Field of Classification Search
CPC ............... H04B 7/185; H04B 7/18539; H04B 7/18547; H04B 7/2125; H04B 7/0695; H04B 7/18563; H04B 7/18504; H04B 7/18528; H04B 7/18552; H04B 7/18554; H04B 7/1853; H04B 7/18573; H04B 7/18532; H04B 7/18515; H04B 7/18521; H04B 7/19; H04B 17/27; H04B 17/328; H04B 7/18523; H04W 28/0226; H04W 84/06; H04W 56/0045; H04W 36/083; H04W 4/029; H04W 48/20; H04W 36/322; H04W 36/324; H04W 4/02; H04W 64/00; H04W 64/003; H04W 36/0077; H04W 16/28; H04W 36/36; H04W 48/10; H04W 56/006; H04W 72/04; H04W 72/046; H04W 84/042; H04W 36/32; H04W 4/027; H04W 40/38; H04W 16/10; H04W 76/19; G01S 19/05; G01S 19/258; G01S 19/33; G01S 19/071; G01S 5/14; G01S 19/07; G01S 19/42; G01S 19/41; G01S 19/47; G01S 19/06; G01S 19/43; G01S 19/40; G01S 19/49; G01S 19/28; G01S 19/072; G01S 5/0263; G01S 19/396; G01S 19/48; G01S 19/52; G01S 19/53; G01S 5/0036; G01S 5/0045; G01S 5/009; G01S 5/10; G01S 1/024; G01S 1/042; G01S 19/10; G01S 19/15; G01S 19/00; G01S 19/246; G01S 5/0257; G01S 5/12; G01S 17/58; G01S 17/931; G01S 19/11; G01S 19/45; G01S 19/31; G01S 2205/007; G01S 5/0009; G01S 2205/008; G01S 13/46; G01S 13/86; G01S 19/39; G01S 5/06; G01S 19/252; G01S 1/00; G01S 19/27; G01S 19/46; G01S 5/0236; G01S 3/14; G01S 19/08; G01S 19/115; G01S 19/24; G01S 5/0244; G01S 19/51; G01S 5/00; G01S 5/0284; G01S 5/163; Y02D 30/70; G01C 21/165; G01C 21/10; G01C 21/18; G01C 21/20; G05D 1/247; G05D 1/248; G05D 2109/10; G05D 2111/30

See application file for complete search history.

(56) References Cited

U.S. PATENT DOCUMENTS

| | | | |
|---|---|---|---|
| 2007/0273581 A1 | 11/2007 | Garrison et al. | |
| 2009/0231192 A1* | 9/2009 | van Diggelen | G01S 19/27 342/357.66 |
| 2012/0146849 A1* | 6/2012 | Xu | G01S 19/27 342/357.29 |
| 2014/0320341 A1* | 10/2014 | Muraki | G01S 19/27 342/357.51 |
| 2015/0070211 A1* | 3/2015 | Cheng | G01S 19/27 342/357.51 |
| 2015/0334678 A1* | 11/2015 | MacGougan | H04W 4/02 701/451 |
| 2016/0269867 A1* | 9/2016 | Zeng | H04W 4/027 |
| 2019/0196024 A1* | 6/2019 | Chen | G01S 19/44 |

* cited by examiner

WIRELESS COMMUNICATION METHOD AND APPARATUS

CROSS-REFERENCE TO RELATED APPLICATIONS

This application is a continuation of International Application No. PCT/CN2022/072394, filed on Jan. 17, 2022, which claims priority to Chinese Patent Application No. 202110057973.9, filed on Jan. 15, 2021. The disclosures of the aforementioned applications are hereby incorporated by reference in their entireties.

TECHNICAL FIELD

This application relates to the field of communication technologies, and in particular, to a wireless communication method and an apparatus.

BACKGROUND

With the development of information technologies, more urgent requirements are imposed on efficient, mobile, and diversified communication. Currently, in some important fields, such as space communication, aviation communication, maritime communication, and military communication, satellites play an irreplaceable role. Satellite communication has advantages such as a long communication distance, a large coverage area, and flexible networking, and can provide services for not only fixed terminals but also various mobile terminals.

A conventional terrestrial network cannot provide seamless coverage, especially in a place such as the sea, a desert, or the air where a base station cannot be deployed. A non-terrestrial communication network (NTN) network such as a satellite communication network or a high-altitude platform is introduced into a terrestrial communication network such as a fifth generation mobile communication (5G) system. By deploying a base station or some base station functions on a high-altitude platform or a satellite to provide seamless coverage for a terminal, and because the high-altitude platform or the satellite is slightly affected by a natural disaster, reliability of the terrestrial communication network can be improved.

A satellite moves around the earth according to a set orbit, and mobility of the satellite causes a very large timing and frequency offset between a terminal and a location. When communicating with the satellite, the terminal needs to obtain a location of the satellite to perform pre-compensation for the time and frequency offset. In the global positioning system (global positioning system, GPS), each satellite has a set of ephemeris and almanac. When obtaining a complete ephemeris and almanac, the satellite needs to continuously monitor a navigation message for more than 750 s, which causes excessively high overheads for NTN communication. Therefore, an ephemeris and a transmission mechanism with a low delay and low signaling overheads need to be designed for a communication requirement of the NTN.

SUMMARY

Embodiments of this application provide a wireless communication method and an apparatus, to implement satellite location indication with a low latency and low signaling overheads.

According to a first aspect, an embodiment of this application provides a wireless communication method.

A first communication apparatus obtains first ephemeris information of a second communication apparatus, where the first ephemeris information includes information about m parameters of n parameters in second ephemeris information, n is equal to 6, and m is a positive integer less than n. The n parameters include a first location parameter, a first location parameter, and a first location parameter in first location information, and a first velocity parameter, a first velocity parameter, and a first velocity parameter in first velocity information. The first communication apparatus determines values of the n parameters in the second ephemeris information, where the values of the n parameters include values of m parameters and values of remaining n−m parameters.

In an embodiment, the first ephemeris information obtained by the first communication apparatus includes information about the m parameters of the n parameters in the second ephemeris information, and the first communication apparatus obtains the values of the n parameters in the second ephemeris information based on the first ephemeris information. To be specific, the n−m parameters in the second ephemeris information are default in the first ephemeris information obtained by the first communication apparatus. In comparison with obtaining information about the n parameters in the second ephemeris information, signaling overheads are saved.

In a possible embodiment, the first communication apparatus communicates with the second communication apparatus based on the second ephemeris information.

In a possible embodiment, the first location parameter, the first location parameter, and the first location parameter in the first location information are respectively location information on an x-axis, a y-axis, and a z-axis in an earth-centered, earth-fixed (ECEF) coordinate system respectively; and the first velocity parameter, the first velocity parameter, and the first velocity parameter in the first velocity information are respectively velocity information Vx, Vy, and Vz in the ECEF coordinate system.

When the ECEF coordinate system is used to represent the ephemeris information, the location information and the velocity information obtained by the first communication device do not change with the rotation or revolution of the earth.

In a possible embodiment, n−m=1, that is, one parameter is default. When the remaining n−m parameters in the second ephemeris information are default location parameters in the first location information, the first communication apparatus obtains a value of the default location parameter based on the first location information and the first velocity information in the first ephemeris information according to the law of universal gravitation. When the remaining n−m parameters in the second ephemeris information are default velocity parameters in the first velocity information, the first communication apparatus obtains a value of the default velocity parameter based on the first location information and the first velocity information in the first ephemeris information according to the law of universal gravitation.

When a parameter (e.g., a velocity parameter or a location parameter) is defaulted in the first ephemeris information, a value of the default parameter may be obtained according to the universal gravitational theorem, so as to obtain complete second ephemeris information.

In a possible embodiment, the first communication apparatus further obtains first indication information, where the first indication information indicates information about remaining n−m default parameters in the first ephemeris information. The first communication apparatus determines the values of the n parameters in the second ephemeris information based on the first indication information and the first ephemeris information.

The first communication apparatus may learn, based on the first indication information, a default parameter or parameters and/or positive and negative information of the default n−m parameters, so as to determine values of the default n−m parameters based on the m parameters included in the first ephemeris information and a constraint relationship between the parameters, to obtain values of all n parameters in the second ephemeris information.

In a possible embodiment, n−m=1. The first indication information indicates a default location parameter in the first ephemeris information and/or whether the default location parameter in the first ephemeris information is positive or negative, and the first communication apparatus obtains the value of the default location parameter based on the first indication information and the first ephemeris information according to the law of universal gravitation; or the first indication information indicates a default velocity parameter in the first ephemeris information and/or whether the default velocity parameter in the first ephemeris information is positive or negative, and the first communication apparatus obtains the value of the default velocity parameter based on the first indication information and the first ephemeris information according to the law of universal gravitation.

When one parameter is default in the first ephemeris information, the first communication apparatus learns the default parameter and/or whether the default parameter is positive or negative based on the first indication information, so as to obtain the default parameter according to the law of universal gravitation.

In a possible embodiment, the first location information in the m parameters included in the first ephemeris information is a difference value relative to a location of a first reference point. That the first communication apparatus determines values of the n parameters in the second ephemeris information based on the first ephemeris information includes: The first communication apparatus obtains, based on the first location information and location information of the first reference point, an actual value corresponding to the first location information in the m parameters. The first communication apparatus determines the values of the n parameters in the second ephemeris information based on the actual value corresponding to the first location information in the m parameters and the first velocity information in the m parameters.

The location information in the first ephemeris information obtained by the first communication apparatus is the difference value relative to the location of the first reference point. In comparison with the geo-center, the location of the first reference point is closer to the second communication apparatus. Therefore, the first location information needs to occupy fewer bits, and signaling overheads can be reduced. The first reference point is a spatial reference point. In an embodiment, the first reference point may be a point, for example, a central point, in an area pre-divided in space. Alternatively, in an embodiment, the first reference point is a reference point indicated by the second communication apparatus by using signaling.

In a possible embodiment, the first communication apparatus further obtains second indication information, where the second indication information includes the location information of the first reference point, and the actual value corresponding to the first location information is a value obtained based on a value of the location of the first reference point and the first location information included in the first ephemeris information; or the second indication information includes location information of a second reference point, and the actual value corresponding to the first location information is a value obtained based on a location of the second reference point, the first velocity information included in the first ephemeris information, and the first location information included in the first ephemeris information.

The location of the second reference point is a location of a ground reference point. The location of the first reference point may be determined based on the location of the second reference point and the first velocity information in the first ephemeris information, and the actual value corresponding to the first location information may be obtained based on the location of the first reference point and the first location information in the first ephemeris information. The second reference point may be a point in an area divided based on longitude and latitude, or a point in a cell.

The first reference point or the second reference point may reuse a reference point delivered in another service or procedure, a reference point corresponding to frequency pre-compensation performed by a satellite on a downlink signal, a reference point used by a user to send an uplink signal for time synchronization, or the like.

In a possible embodiment, one piece of first location parameter information in the first location information in the information about the m parameters included in the first ephemeris information is a location reference value, and another piece of first location parameter information is a location relative value based on the location reference value; and/or one piece of first velocity parameter information in the first velocity information in the m parameters included in the first ephemeris information is a velocity reference value and another piece of first velocity parameter information is a velocity relative value based on the velocity reference value. That the first communication apparatus determines values of the n parameters in the second ephemeris information based on the first ephemeris information includes: The first communication apparatus determines, based on the location reference value and the location relative value, the actual value corresponding to the first location information in the m parameters, and/or determines, based on the velocity reference value and the velocity relative value, the actual value corresponding to the first velocity information in the m parameters. The first communication apparatus determines the values of n parameter in the second ephemeris information based on the actual value of the first location information in the m parameters and the actual value of the first velocity information in the m parameters.

In this manner, the location information and/or the velocity information may be the reference value and the corresponding relative value. When a difference between values of parameters of the location information is small, indication overheads can be greatly reduced by using the reference value and the relative value for representation.

In a possible embodiment, the first communication apparatus further obtains third indication information, where the third indication information includes a location and/or velocity indication manner in the first ephemeris information; and the first communication apparatus determines the values of the n parameters in the second ephemeris information based on the third indication information and the first ephemeris information.

The location and/or velocity indication manner includes whether to use the indication manner of using the relative value and/or the parameter used as the reference value. In some cases, when a difference between values of parameters in the location information or the velocity information is large, it is not recommended to use the relative value for identification. Therefore, different indication manners need to be flexibly used based on an actual location, and the location and/or velocity indication manner may be learned by using the third indication information, so as to obtain an actual value of the location information and/or the velocity information.

In a possible embodiment, a quantity of bits required by the n−m parameters is greater than or equal to a quantity of bits required by any one of the m parameters. That a parameter that needs to occupy a large quantity of bits is default can reduce more indication overheads.

According to a second aspect, an embodiment of this application provides a wireless communication method.

The second communication apparatus determines the first ephemeris information, where the first ephemeris information includes the information about m parameters of n parameters in the second ephemeris information, n is equal to 6, and m is a positive integer less than n, and the n parameters include the first location parameter, the first location parameter, and the first location parameter in the first location information, and the first velocity parameter, the first velocity parameter, and the first velocity parameter in the first velocity information. The second communication apparatus sends the first ephemeris information values to the first communication apparatus, where the first ephemeris information is used to determine the values of n parameters in the second ephemeris information, and the values of n parameters include values of the m parameters and values of remaining n−m parameters.

In the method, the n−m parameters of the n parameters in the second ephemeris information are default in the first ephemeris information sent by the second communication apparatus to the first communication apparatus, so that the first communication apparatus determines complete second ephemeris information based on the first ephemeris information. In comparison with sending information about the n parameters in the second ephemeris information, signaling overheads are reduced.

In a possible embodiment, the first location parameter, the first location parameter, and the first location parameter in the first location information are respectively location information on an x-axis, a y-axis, and a z-axis in an ECEF coordinate system; and the first velocity parameter, the first velocity parameter, and the first velocity parameter in the first velocity information are respectively velocity information Vx, Vy, and Vz in the ECEF coordinate system.

When the ECEF coordinate system is used to represent the ephemeris information, the location information and the velocity information obtained by the first communication device do not change with the rotation or revolution of the earth.

In a possible embodiment, the second communication apparatus sends first indication information to the first communication apparatus, where the first indication information indicates information about the remaining n−m default parameters in the first ephemeris information.

The second communication apparatus indicates, by using the first indication information, a default parameter or parameters and/or positive and negative information of the n−m default parameters, so that the first communication apparatus determines values of the default n−m parameters based on the first indication information and the first ephemeris information.

In a possible embodiment, n−m=1. The first indication information indicates a default location parameter in the first ephemeris information and/or whether the default location parameter in the first ephemeris information is positive or negative; or the first indication information indicates a default velocity parameter in the first ephemeris information and/or whether the default velocity parameter in the first ephemeris information is positive or negative.

When one parameter is default in the first ephemeris information, the second communication apparatus flexibly indicates the default parameter by using the first indication information, to learn the default parameter and/or whether the default parameter is positive or negative.

In a possible embodiment, the first location information in the m parameters included in the first ephemeris information is a difference value relative to a location of a first reference point.

The first reference point may be a spatial reference point. In comparison with a distance between the geo-center and the second communication apparatus, a distance between the first reference point and the second communication apparatus is shorter, and the first location information needs to occupy fewer bits, so that signaling overheads can be reduced. In an embodiment, the first reference point may be a point, for example, a central point, in an area pre-divided in space.

In a possible embodiment, the second communication apparatus further sends second indication information to the first communication apparatus, where the second indication information includes location information of the first reference point, and the location information of the first reference point is location information of a space reference point; or the second indication information includes location information of a second reference point, and the location information of the second reference point is location information of a terrestrial reference point.

The first reference point and the second reference point may reuse information about a reference point delivered in another service or procedure. Therefore, signaling overheads are further reduced.

In a possible embodiment, one piece of first location parameter information in the first location information in the information about the m parameters included in the first ephemeris information is a location reference value, and another piece of first location parameter information is a location relative value based on the location reference value; and/or one piece of first velocity parameter information in the first velocity information in the m parameters included in the first ephemeris information is a velocity reference value and another piece of first velocity parameter information is a velocity relative value based on the velocity reference value.

In this manner, the location information and/or the velocity information may be the reference value and the corresponding relative value. When a difference between values of parameters of the location information is small, indication overheads can be greatly reduced by using the reference value and the relative value for representation.

In a possible embodiment, the second communication apparatus sends third indication information to the first communication apparatus, where the third indication information includes a location and/or velocity indication manner in the first ephemeris information.

The location and/or velocity indication manner includes whether to use the indication manner of using the relative value and/or the parameter used as the reference value. In some cases, when a difference between values of parameters in the location information or the velocity information is large, it is not recommended to use the relative value for identification. Therefore, different indication manners need to be flexibly used based on an actual location, and the first communication apparatus may be notified of the location and/or velocity indication manner by using the third indication information.

In a possible embodiment, a quantity of bits required by the n−m default parameters is greater than or equal to a quantity of bits required by any one of the m parameters. When the ephemeris information is indicated, that a parameter that needs to occupy a large quantity of bits is default can reduce more indication overheads.

According to a third aspect, an embodiment of this application further provides a communication apparatus. The communication apparatus may be applied to the first communication apparatus in the first aspect. The communication apparatus may be a terminal device, or may be an apparatus (for example, a chip, a chip system, or a circuit) in a terminal device, or may be an apparatus that can be used with a terminal device. In a possible embodiment, the communication apparatus may include modules or units that are in a one-to-one correspondence with the methods/operations/steps/actions according to the first aspect. The modules or units may be hardware circuits or software, or may be implemented by the hardware circuit in combination with the software. In a possible embodiment, the communication apparatus may include a processing unit and a transceiver unit. The processing unit is configured to invoke the transceiver unit to perform a receiving and/or sending function. For example, the transceiver unit is configured to obtain first ephemeris information of a second communication apparatus, where the first ephemeris information includes information about m parameters of n parameters in second ephemeris information, n is equal to 6, and m is a positive integer less than n. The n parameters include a first location parameter, a first location parameter, and a first location parameter in first location information, and a first velocity parameter, a first velocity parameter, and a first velocity parameter in first velocity information.

The processing unit is configured to determine values of the n parameters in the second ephemeris information based on the first ephemeris information, where the values of the n parameters include values of the m parameters and values of remaining n−m parameters.

The transceiver unit is further configured to communicate with the second communication apparatus based on the second ephemeris information.

In a possible embodiment, the first location parameter, the first location parameter, and the first location parameter in the first location information are respectively location information on an x-axis, a y-axis, and a z-axis in an ECEF coordinate system; and the first velocity parameter, the first velocity parameter, and the first velocity parameter in the first velocity information are respectively velocity information Vx, Vy, and Vz in the ECEF coordinate system.

In a possible embodiment, n−m=1. The processing unit is configured to: when the remaining n−m parameters in the second ephemeris information are default location parameters in the first location information, obtain a value of the default location parameter based on the first location information and the first velocity information in the first ephemeris information according to the law of universal gravitation; or when the remaining n−m parameters in the second ephemeris information are default velocity parameters in the first velocity information, obtain, by the first communication apparatus, a value of the default velocity parameter based on the first location information and the first velocity information in the first ephemeris information according to the law of universal gravitation.

In a possible embodiment, the processing unit is further configured to: obtain first indication information, where the first indication information indicates information about the remaining n−m default parameters in the first ephemeris information; and determine the values of the n parameters in the second ephemeris information based on the first indication information and the first ephemeris information.

In a possible embodiment, n−m=1. The first indication information indicates a default location parameter in the first ephemeris information and/or whether the default location parameter in the first ephemeris information is positive or negative, and the processing unit is configured to obtain the value of the default location parameter based on the first indication information and the first ephemeris information according to the law of universal gravitation; or the first indication information indicates a default velocity parameter in the first ephemeris information and/or whether the default velocity parameter in the first ephemeris information is positive or negative, and the processing unit is configured to obtain the value of the default velocity parameter based on the first indication information and the first ephemeris information according to the law of universal gravitation.

In a possible embodiment, the first location information in the m parameters included in the first ephemeris information is a difference value relative to a location of a first reference point. That the processing unit is configured to determine the values of the n parameters in the second ephemeris information based on the first ephemeris information includes: The processing unit is configured to: obtain, based on the first location information and location information of the first reference point, an actual value corresponding to the first location information in the m parameters; and determine the values of the n parameters in the second ephemeris information based on the actual value corresponding to the first location information in the m parameters and the first velocity information in the m parameters.

In a possible embodiment, the processing unit is further configured to obtain second indication information, where the second indication information includes the location information of the first reference point, and the actual value corresponding to the first location information is a value obtained based on a value of the location of the first reference point and the first location information included in the first ephemeris information; or the second indication information includes location information of a second reference point, and the actual value corresponding to the first location information is a value obtained based on a location of the second reference point, the first velocity information included in the first ephemeris information, and the first location information included in the first ephemeris information.

In a possible embodiment, one piece of first location parameter information in the first location information in the information about the m parameters included in the first ephemeris information is a location reference value, and another piece of first location parameter information is a location relative value based on the location reference value; and/or one piece of first velocity parameter information in the first velocity information in the m parameters included in the first ephemeris information is a velocity reference value and another piece of first velocity parameter information is a velocity relative value based on the velocity reference value. In determining the values of the n parameters in the second ephemeris information based on the first ephemeris information, the processing unit is configured to determine, based on the location reference value and the location relative value, the actual value corresponding to the first location information in the m parameters, and/or determine, based on the velocity reference value and the velocity relative value, the actual value corresponding to the first velocity information in the m parameters; and determine values of n parameter in the second ephemeris information based on the actual value of the first location information in the m parameters and the actual value of the first velocity information in the m parameters.

In a possible embodiment, the processing unit is further configured to obtain third indication information, where the third indication information includes a location and/or velocity indication manner in the first ephemeris information; and the processing unit is further configured to determine the values of the n parameters in the second ephemeris information based on the third indication information and the first ephemeris information.

It should be noted that, for beneficial effects of the embodiments of the communication apparatus provided in the third aspect of embodiments of this application, refer to beneficial effects of the wireless communication method according to the first aspect. Details are not described herein again.

According to a fourth aspect, an embodiment of this application further provides a communication apparatus. The communication apparatus may be applied to the second communication apparatus in the second aspect. The communication apparatus may be a network device (e.g., a satellite), or may be an apparatus (for example, a chip, a chip system, or a circuit) in a network device, or may be an apparatus that can be used with a network device. In a possible embodiment, the communication apparatus may include modules or units that are in a one-to-one correspondence with the methods/operations/steps/actions according to the second aspect. The modules or units may be hardware circuits or software, or may be implemented by the hardware circuit in combination with the software. In a possible embodiment, the communication apparatus may include a processing unit and a transceiver unit. The processing unit is configured to invoke the transceiver unit to perform a receiving and/or sending function. For example, the processing unit is configured to determine first ephemeris information, where the first ephemeris information includes information about m parameters of n parameters in second ephemeris information, n is equal to 6, and m is a positive integer less than n. The n parameters include a first location parameter 1, a first location parameter 2, and a first location parameter 3 in first location information, and a first velocity parameter 1, a first velocity parameter 2, and a first velocity parameter 3 in first velocity information.

The transceiver unit is configured to send the first ephemeris information values to a first communication apparatus, where the first ephemeris information is used to determine values of the n parameters in the second ephemeris information, and the values of the n parameters include values of the m parameters and values of remaining n−m parameters.

In a possible embodiment, the first location parameter, the first location parameter, and the first location parameter in the first location information are respectively location information on an x-axis, a y-axis, and a z-axis in an ECEF coordinate system respectively; and the first velocity parameter, the first velocity parameter, and the first velocity parameter in the first velocity information are respectively velocity information Vx, Vy, and Vz in the ECEF coordinate system.

In a possible embodiment, the transceiver unit is further configured to send first indication information to the first communication apparatus, where the first indication information indicates information about the remaining n−m default parameters in the first ephemeris information.

In a possible embodiment, the first indication information indicates a default location parameter in the first ephemeris information and/or whether the default location parameter in the first ephemeris information is positive or negative; or the first indication information indicates a default velocity parameter in the first ephemeris information and/or whether the default velocity parameter in the first ephemeris information is positive or negative.

In a possible embodiment, the first location information in the m parameters included in the first ephemeris information is a difference value relative to a location of a first reference point.

In a possible embodiment, the transceiver unit is further configured to send second indication information to the first communication apparatus, where the second indication information includes location information of the first reference point, and the location information of the first reference point is location information of a space reference point; or the second indication information includes location information of a second reference point, and the location information of the second reference point is location information of a terrestrial reference point.

In a possible embodiment, one piece of first location parameter information in the first location information in the information about the m parameters included in the first ephemeris information is a location reference value, and another piece of first location parameter information is a location relative value based on the location reference value; and/or one piece of first velocity parameter information in the first velocity information in the m parameters included in the first ephemeris information is a velocity reference value and another piece of first velocity parameter information is a velocity relative value based on the velocity reference value.

In a possible embodiment, the transceiver unit is further configured to send third indication information to the first communication apparatus, where the third indication information includes a location and/or velocity indication manner in the first ephemeris information.

In a possible embodiment, a quantity of bits that needs to be occupied by the n−m default parameters in the first ephemeris information is greater than or equal to a quantity of bits that needs to be occupied by any one of the m parameters.

It should be noted that, for beneficial effects of the embodiments of the communication apparatus provided in the fourth aspect of embodiments of this application, refer to beneficial effects of the wireless communication method according to the second aspect. Details are not described herein again.

According to a fifth aspect, an embodiment of this application further provides a communication apparatus, including a processor configured to execute a computer program or executable instructions stored in a memory. When the computer program or the executable instructions are executed, the apparatus is enabled to perform the method in the first aspect and any one of the possible embodiments of the first aspect.

In a possible embodiment, the memory is integrated with the processor.

In another possible embodiment, the memory is located outside the communication apparatus.

The communication apparatus further includes a communication interface. The communication interface is used by the communication apparatus to communicate with another device, for example, send or receive data and/or a signal. For example, the communication interface may be a transceiver, a circuit, a bus, a module, or a communication interface of another type.

According to a sixth aspect, an embodiment of this application further provides a communication apparatus, including a processor configured to execute a computer program or executable instructions stored in a memory. When the computer program or the executable instructions are executed, the apparatus is enabled to perform the method in the second aspect and any one of the possible embodiments of the second aspect.

In a possible embodiment, the memory is integrated with the processor.

In another possible embodiment, the memory is located outside the communication apparatus.

The communication apparatus further includes a communication interface. The communication interface is used by the communication apparatus to communicate with another device, for example, send or receive data and/or a signal. For example, the communication interface may be a transceiver, a circuit, a bus, a module, or a communication interface of another type.

According to a seventh aspect, an embodiment of this application further provides a communication apparatus, including a communication interface and a logic circuit. The communication interface is configured to input or output a signal or data. The communication interface is configured to obtain first ephemeris information. The logic circuit is configured to perform the method according to the first aspect and any one of the possible embodiments of the first aspect, and obtain second ephemeris information based on the first ephemeris information. The communication interface is further configured to communicate with a second communication apparatus based on the second ephemeris information.

According to an eighth aspect, an embodiment of this application further provides a communication apparatus, including a communication interface and a logic circuit. The communication interface is configured to input or output a signal or data. The logic circuit is configured to perform the method according to any one of the second aspect and the possible embodiments of the second aspect to determine the first ephemeris information. The communication interface is configured to output the first ephemeris information.

According to a ninth aspect, an embodiment of this application further provides a computer-readable storage medium. The computer-readable storage medium stores a computer program, and the computer program is executed by a processor, so that some or all steps of the method according to the first aspect and any one of the possible embodiments of the first aspect and the second aspect and any one of the possible embodiments of the second aspect are performed.

According to a tenth aspect, an embodiment of this application further provides a computer program product including an executable instruction, where when the computer program product runs on user equipment, some or all of the operations in the method according to any one of the first aspect and the possible embodiments of the first aspect and the method according to the second aspect and any one of the possible embodiments of the second aspect are performed.

According to an eleventh aspect, an embodiment of this application further provides a chip system. The chip system includes a processor, and may further include a memory, configured to implement the method according to the first aspect and any one of the possible embodiments of the first aspect, and the method according to any one of the second aspect and the possible embodiments of the second aspect. The chip system may include a chip, or may include a chip and another discrete component.

According to a twelfth aspect, an embodiment of this application further provides a communication system, including the communication apparatus provided in the third aspect and the communication apparatus provided in the fourth aspect.

BRIEF DESCRIPTION OF DRAWINGS

The following describes some accompanying drawings in embodiments of this application.

DESCRIPTION OF EMBODIMENTS

Embodiments of this application provide a wireless communication method and an apparatus, to implement satellite ephemeris indication with a low latency and low signaling overheads.

The following describes embodiments of this application with reference to accompanying drawings in embodiments of this application.

In this application, "/" represents "or". The term "and/or" describes only an association relationship between associated objects and indicates that three relationships may exist.

For example, A and/or B may represent the following three cases: Only A exists, both A and B exist, and only B exists. In the specification and claims in embodiments of this application, terms "first", "second", and so on are intended to distinguish between different objects but do not indicate a particular order of the objects. For example, the first communication apparatus, the second communication apparatus, and the like are used to distinguish different communication apparatuses, but are not used to describe a specific order of target objects. In embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. In description of embodiments of this application, unless otherwise specified, "a plurality of" means two or more than two. For example, a plurality of processing units are two or more processing units, and a plurality of systems are two or more systems.

Technical solutions in this application may be applied to a non-terrestrial network (NTN) system such as an uncrewed aerial vehicle, a satellite communication system, and high-altitude platform (HAPS) communication. The satellite communication system is used as an example. The satellite communication system may be integrated into an existing mobile communication system, for example, a fourth generation (4G) communication system such as a long term evolution (LTE) system, a fifth generation (5G) communication system such as a new radio (NR) system, or another future mobile communication system.

Figure 1:
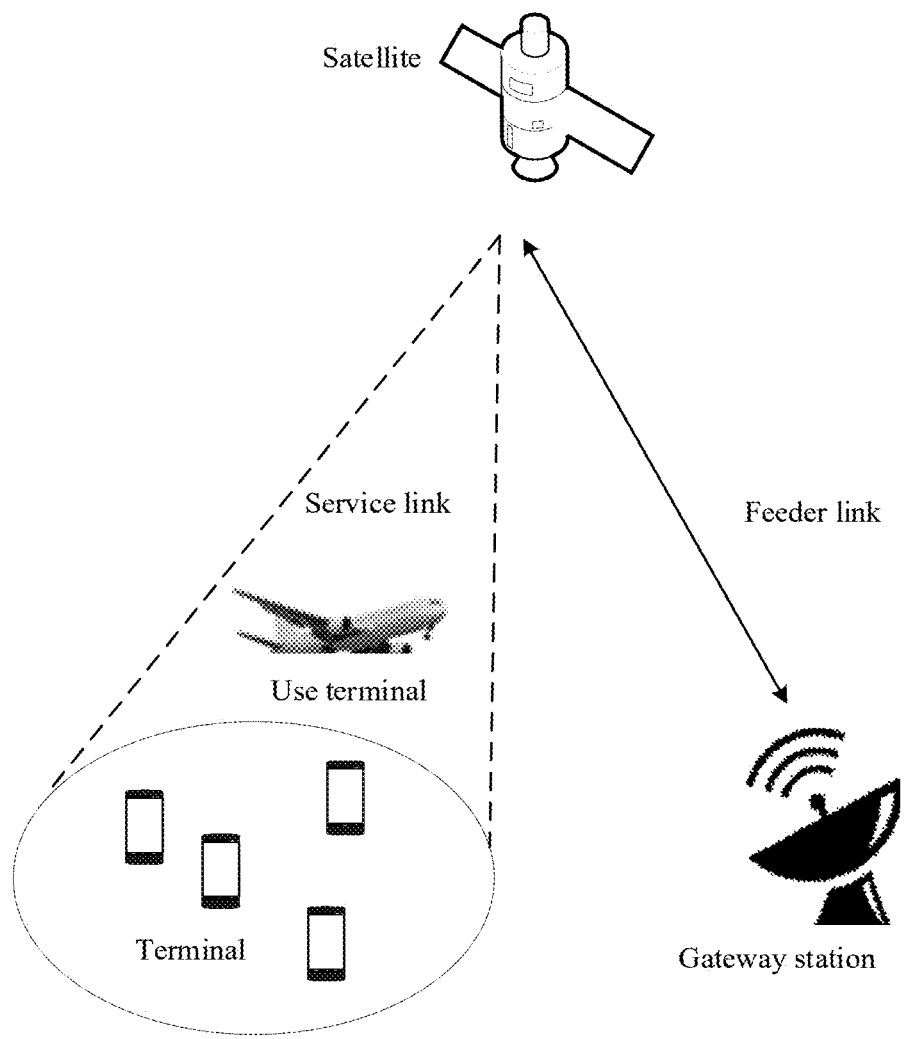
FIG. 1 is a schematic diagram of a communication system applicable to an embodiment of this application.

FIG. 1 is an example of a communication system to which an embodiment of this application is applicable. As shown in FIG. 1, a satellite and a gateway station are network devices, and are configured to provide a communication service for a terminal. The gateway station may also be referred to as a terrestrial station, a gateway station, or the like. A link between the satellite and the terminal is referred to as a service link, and a link between the satellite and the gateway station is referred to as a feeder link.

When the satellite works in transparent transmission mode, the satellite has a relay forwarding function. The gateway station has functions of a base station or some functions of a base station. In an embodiment, the gateway station may be considered as a terrestrial station; or a terrestrial station and the gateway station may be separately deployed.

When the satellite works in a regenerative mode, and the satellite has a data processing capability and functions of a base station or some functions of a base station, the satellite may be considered as a base station.

The satellite mentioned in embodiments of this application may be a satellite base station, or a network side device carried on a satellite. In this application, a satellite base station, a gateway station, or a terrestrial station is referred to as a network device.

The network device in this application may be an evolved NodeB (eNB or eNodeB) in LTE, a base station in a 5G network, a broadband network service gateway (BNG), an aggregation switch, anon-3rd generation partnership project (3GPP) access device, or the like. This is not limited in embodiments of this application. In an embodiment, the base station in embodiments of this application may include base stations in various forms, for example, a macro base station, a micro base station (also referred to as a small cell), a relay station, an access point, a next-generation base station (gNodeB, gNB), a transmitting and receiving point (TRP), a transmitting point (TP), a mobile switching center, a device that functions as a base station in a device-to-device (D2D), vehicle-to-everything (V2X), machine-to-machine (M2M), or internet of things (IoT) communication, or the like. This is not limited in embodiments of this application.

A network device may communicate and interact with a core network device, to provide a communication service for a terminal device. For example, the core network device is a device in a 5G core network (CN). As a bearer network, the core network provides an interface to a data network, and provides communication connection, authentication, management, and policy control for user equipment (UE), data service bearing, and the like. The CN may further include network elements such as an access and mobility management function (AMF) network element, a session management function (SMF) network element, an authentication server function (AUSF) network element, a policy control (PCF) node, and a user plane function (UPF) network element.

The terminal mentioned in embodiments of this application may be an internet of things terminal, and may be user equipment (UE), an access terminal, a subscriber unit, a subscriber station, a mobile station, a remote station, a remote terminal, a mobile device, a user terminal (e.g., terminal equipment), a wireless communication device, a user agent, or a user apparatus. Alternatively, the terminal device may be a satellite phone, a cellular phone, an intelligent mobile phone, a wireless data card, a wireless modem, or a machine-type communication device.

Alternatively, the terminal device may be a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a communication device on a high-altitude aircraft, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a 5G network or a wireless communication network, or the like. This is not limited in this application.

Based on different orbit heights, satellite communication systems may be classified into the following three types: a geostationary earth orbit (GEO) satellite communication system, a medium earth orbit (MEO) satellite communication system, and a low earth orbit (LEO) satellite communication system. A GEO satellite is also referred to as a geostationary orbit satellite and has an orbit height of 35786 km. A main advantage of the GEO satellite is as follows. The GEO satellite is stationary relative to the ground and provides a very large coverage area. However, the GEO satellite has the following disadvantages. If a distance between the GEO satellite and the earth is too long, a large-diameter antenna is required. A transmission delay is long, which is about 0.5 s, and cannot meet a requirement of a real-time service. In addition, the GEO satellite has limited orbit resources, high transmission costs, and cannot provide coverage for the polar areas. A MEO satellite has an orbit height from 2000 km to 35786 km, and a relatively small quantity of satellites can provide global coverage. However, a transmission delay of the MEO satellite is larger than a transmission delay of a LEO satellite. Therefore, the MEO satellite is mainly used for positioning and navigation. A LEO (LEO) satellite has an orbit height from 300 km to 2000 km. In comparison with the MEO satellite and the GEO satellite, the LEO satellite has a smaller orbit height, a shorter data transmission delay, less power loss, and lower launch costs.

In satellite communication, there is a large timing offset and a large frequency offset between a terminal and a satellite. When sending an uplink signal, the terminal needs to estimate the time offset and the frequency offset between the terminal and the satellite by obtaining satellite location information and location information of the terminal, and compensate in advance. Each satellite in the global navigation satellite system (GNSS) has ephemeris information. The satellite delivers the ephemeris information based on a specified rule through a navigation message. The terminal needs to monitor navigation for more than 750 s to obtain complete ephemeris, which is time-consuming.

Figure 3:
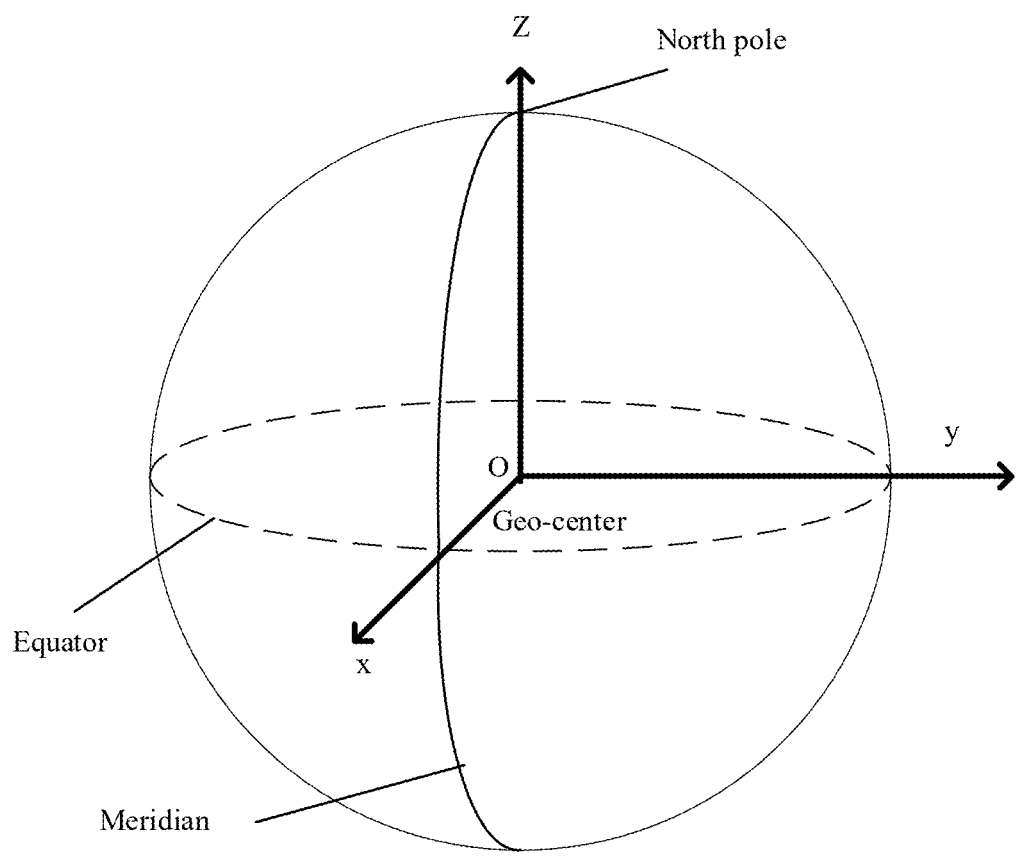
FIG. 3 is a schematic diagram of an earth-centered, earth-fixed coordinate system.

To reduce signaling overheads, an ephemeris parameter that needs to be delivered may be determined based on a communication requirement. For example, an ephemeris parameter used for time offset or frequency offset compensation may be a location parameter (x, y, z) and a velocity parameter (Vx, Vy, Vz) of the satellite. A user may know the time offset based on a relative location of the user and the satellite, and may know a Doppler frequency offset based on a relative velocity of the user and the satellite. The location parameter (x, y, z) and the velocity parameter (Vx, Vy, Vz) may be parameters represented by the earth-centered earth-fixed ECEF) coordinate system. FIG. 3 is a schematic diagram of an ECEF coordinate system. The ECEF coordinate system is fixed on the earth, so it revolves in space as the earth revolves both round the sun and on its own axis. Consequently, coordinates of any fixed point on the earth in the earth coordinate system do not change due to the revolution of the earth. The coordinate system uses the geo-center O as the ordinate origin, a z axis points to the geographic north pole, an x axis points to the intersection point of the prime meridian and the earth's equator, and the x, y, and z axes form a right-hand rectangular coordinate system. An ephemeris delivered in the foregoing manner includes motion status information of a satellite, and may be directly used by a terminal. In comparison with delivering complete ephemeris information in the GNSS, overheads of the terminal can be reduced. Considering a height of the satellite and accuracy of required location and velocity information, the signaling overheads are still high. As shown in Table 1, Table 1 provides an example of signaling overheads when the foregoing method is used. It can be learned from Table 1 that three parameters of a location and three parameters of a velocity of the satellite need to be represented by 144 bits in total.

TABLE 1

Signaling overheads of indicating a location and a velocity of the satellite

| Information | Scope | Accuracy | Quantity of bits (bits) |
|---|---|---|---|
| Satellite location | ±43000 km | 0.33 m | 3*28 = 84 |
| Satellite velocity | ±8 km/s | 0.015 m/s | 3*20 = 60 |

To resolve the foregoing problem, this application provides a wireless communication method, so that the signaling overheads of indicating satellite ephemeris can be further reduced, and a delay can be reduced.

The first communication apparatus in this application may be a terminal, for example, an internet of things terminal, and the second communication apparatus may be a network device, for example, a satellite base station, a gateway station, or a terrestrial station. The following provides descriptions by using the first communication apparatus as a terminal and the second communication apparatus as a network device.

Figure 4:
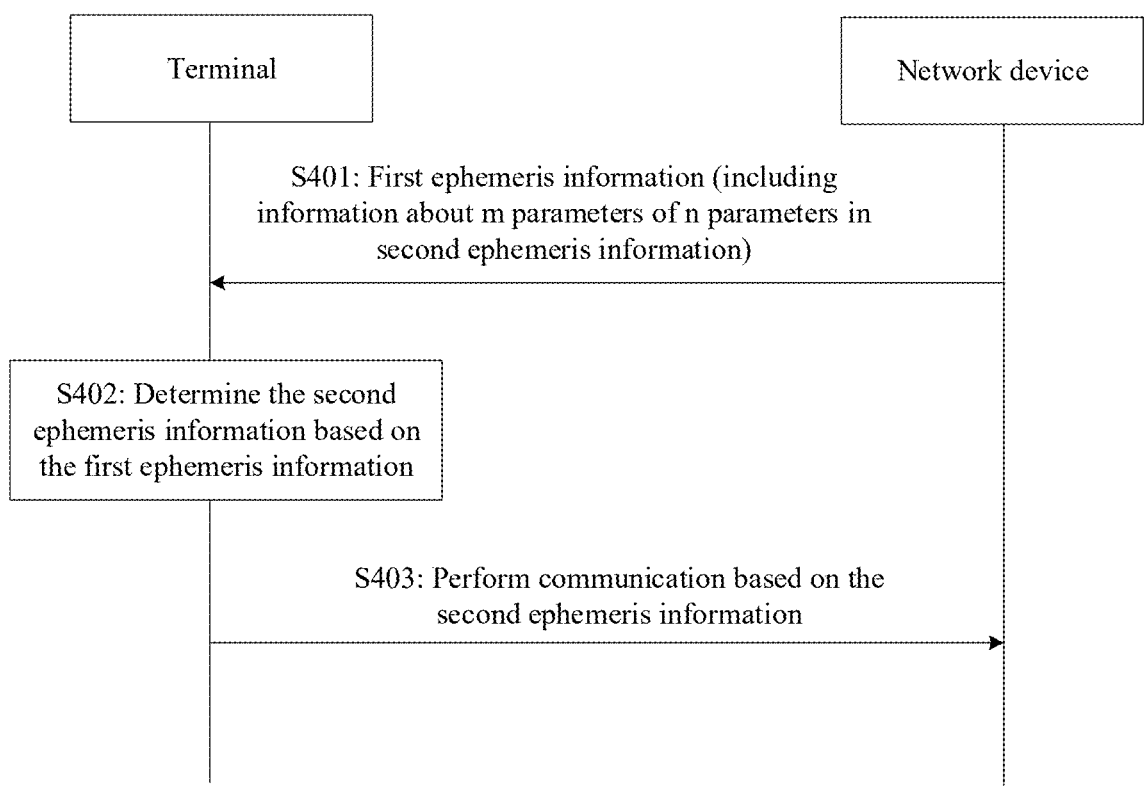
FIG. 4 is a schematic diagram of interaction of a communication method according to an embodiment of this application.

FIG. 4 is a schematic diagram of interaction of a communication method according to an embodiment of this application. In the method shown in FIG. 4, a terminal receives first ephemeris information in which one or more parameters are default, obtains second ephemeris information with complete parameters based on the first ephemeris information, and then performs communication based on the second ephemeris information.

In operation S401, a network device sends the first ephemeris information to the terminal, and correspondingly, the terminal receives the first ephemeris information sent by the network device.

The first ephemeris information includes information about m parameters of n parameters in the second ephemeris information, where n is equal to 6, and m is a positive integer less than n. The n parameters include a first location parameter 1, a first location parameter 2, and a first location parameter 3 in first location information, and a first velocity parameter 1, a first velocity parameter 2, and a first velocity parameter 3 in first velocity information. The second ephemeris information is ephemeris information of the network device (e.g., a satellite).

In an embodiment, the information about the m parameters included in the first ephemeris information may be actual values of the parameters. In an embodiment, the first location information in the information about the m parameters included in the first ephemeris information may be a difference value of each location parameter relative to one location reference point. In an embodiment, the first location information in the information about the m parameters included in the first ephemeris information may be a location reference value and a location relative value based on the location reference value, and/or the first velocity information may be a velocity reference value and a velocity relative value based on the velocity reference value.

In a possible embodiment, the network device further sends indication information to the terminal, and correspondingly, the terminal receives the indication information sent by the network device.

In an embodiment, the indication information indicates a default location parameter in the first ephemeris information and/or whether the default location parameter in the first ephemeris information is positive or negative. In an embodiment, when the information about the parameter included in the first ephemeris information is the difference value based on the location reference point, the indication information indicates location information of the reference point. In an embodiment, when the information about the parameter included in the first ephemeris information includes a parameter used as the reference value and the relative value based on the reference value, the indication information further includes an indication manner of a location and/or a velocity in the first ephemeris information.

In a possible embodiment, the indication information may be carried implicitly. For example, a segment of data is scrambled by using a scrambling code, and a parameter of the scrambling code is related to which parameter is default. For example, a scrambling code parameter 1 corresponds to that a parameter x is default, a scrambling code parameter 2 corresponds to that the parameter x is default, or a scrambling code parameter 3 corresponds to that a parameter Vy is default. The scrambled data may be control channel data, data channel data, a reference signal, or the like, or may be the first ephemeris information.

In a possible embodiment, the first ephemeris information is carried in system information, for example, a system information block (system information block, SIB). The indication information may also be carried in the SIB.

The following describes in detail various possible embodiment methods of the first ephemeris information and the indication information. Details are not described herein.

In operation S402, the terminal determines the second ephemeris information based on the first ephemeris information.

In an embodiment, the terminal determines values of the n parameters in the second ephemeris information based on the first ephemeris information, where the values of the n parameters include information about the m parameters and values of remaining n−m parameters. In other words, the terminal determines values of all parameters of the location information and the velocity information in the second ephemeris information.

Figure 5:
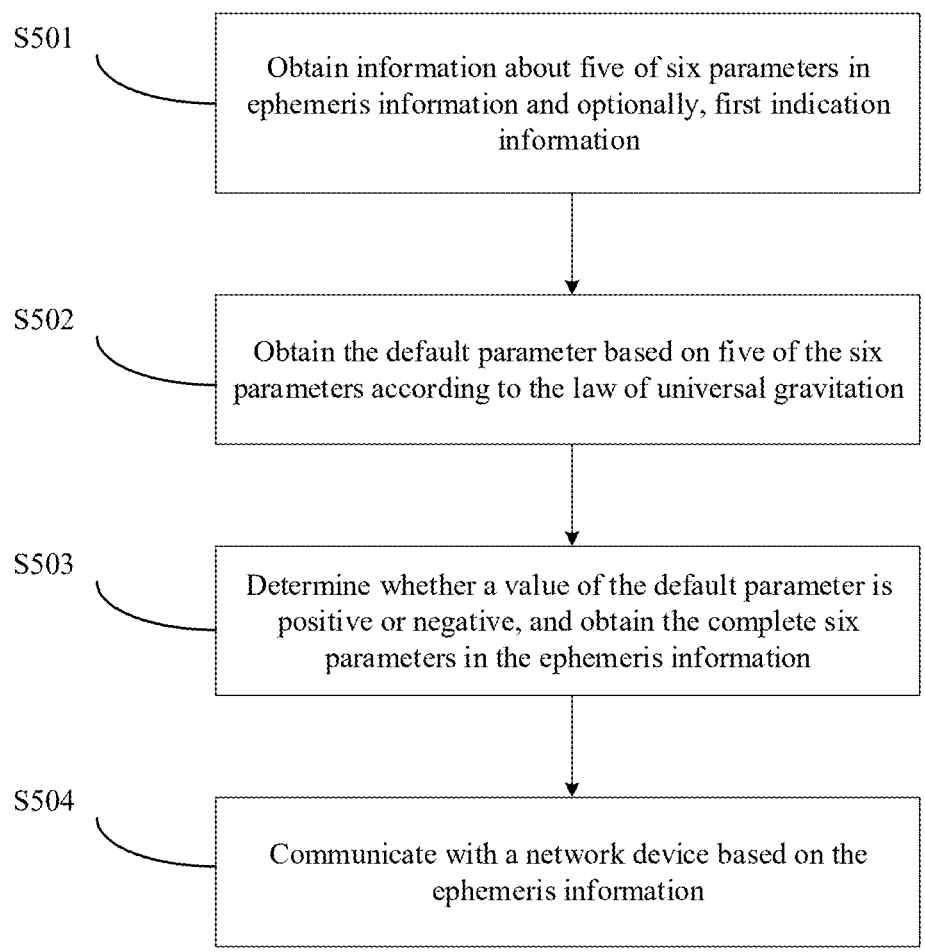
FIG. 5 is a schematic flowchart of a wireless communication method according to an embodiment of this application.

In a possible embodiment, the terminal determines the values of the remaining n−m parameters based on the information about the m parameters included in the first ephemeris information and the law of universal gravitation. FIG. 5 is a flowchart of a method on a terminal side when n−m=1. Details are described below, and details are not described herein.

In another possible embodiment, the terminal determines the values of the remaining n-m parameters based on the information about the m parameters included in the first ephemeris information, a first constraint condition, and a second constraint condition, where n−m=2, and the first constraint condition is the foregoing law of universal gravitation. Refer to descriptions in FIG. 5. The second constraint condition may be a satellite orbit height. The satellite has a fixed orbital height, and may have a mapping relationship with identification information of the satellite. The satellite identification information may be a satellite identification (ID), a height ID, or an ephemeris ID.

In a possible embodiment, the first ephemeris information includes two parameters of the location information and two parameters of the velocity information. The terminal may determine the orbit height based on the identification information of the satellite. The velocity of a satellite is determined based on the satellite orbit height (h) according to the law of universal gravitation. Then, a default velocity parameter is determined based on the determined velocity of the satellite and two parameters in the velocity information in the first ephemeris information (where for details, refer to the following formula 2). Then, a default location parameter is determined based on the two parameters of the location information and the three parameters of the velocity information that are included in the first ephemeris information according to the law of universal gravitation (where for details, refer to the following formula 3).

In operation S403, the terminal performs communication based on the second ephemeris information.

In an embodiment, the terminal estimates a time offset and/or a frequency offset between the terminal and the network device based on location information of the terminal and the location information and the velocity information in the second ephemeris information, and communicates with the network device based on the time offset and/or the frequency offset, to implement time and frequency synchronization.

In the foregoing embodiment, the first ephemeris information sent by the network device to the terminal includes the information about the m parameters of n parameters in the second ephemeris information, and the terminal obtains default n−m parameters based on the information about the m parameters. In comparison with delivering information about the n parameters, parameter indication overheads are reduced.

FIG. 5 is a schematic flowchart of a terminal side in a wireless communication method according to this application, and is applicable to a case in which n−m=1.

S501: Obtain information about five of six parameters in ephemeris information and optionally, first indication information.

The six parameters in the ephemeris information include three parameters of location information and three parameters of velocity information.

In an embodiment, the ephemeris information may be represented by using ECEF coordinates: The location parameters are x, y, and z, and the velocity parameters are Vx, Vy, and Vz. The terminal obtains the information about five parameters of x, y, z, Vx, Vy and Vz in the ephemeris information. Alternatively, the location information and the velocity information may be represented by using another coordinate system.

In a possible embodiment, a default parameter is specified in a protocol or agreed upon in advance by a transmit end and a receive end. For example, bits are set based on a maximum value of each of the six parameters in the ephemeris information, and a quantity of bits that need to be occupied is max(x)+max(y)+max(z)+max(Vx)+max(Vy)+max(Vz), where max( ) indicates a maximum quantity of bits occupied by a parameter in parentheses ( ). In this case, a parameter that occupies most bits may be selected as a default parameter.

In an embodiment, satellites with different orbit heights may use different default parameters.

In another possible embodiment, the network device indicates the default parameter by using the first indication information. For example, bits are set based on a maximum value of a sum of three parameters of the location information in the ephemeris information, and bits are set based on a maximum value of a sum of three parameters of the velocity information. In this case, the quantity of bits that need to be occupied is max(x+y+z)+max(Vx+Vy+Vz). In this case, the first indication information may be used to indicate the default parameter.

The following describes in detail a possible embodiment of the first indication information, and details are not described herein.

S502: Obtain the default parameter based on five of the six parameters in the second ephemeris information according to the law of universal gravitation.

The formula for universal gravitation is as follows:

$$G\frac{mM}{(R+h)^2} = mV^2/(R+h) \qquad \text{Formula 1}$$

G represents gravitational constant, M represents the earth's mass, R represents the earth's radius, h represents a satellite height, v represents a velocity, and the gravitational constant GM=3.986004418e14, where e14 represents the $14^{th}$ power of 10.

According to a velocity relationship $V^2 = +V_x^2 + V_y^2 + V_z^2$, the instantaneous distance between the satellite and the geo-center can be deduced:

$$(R+h) = \frac{GM}{V^2} = \frac{GM}{V_x^2 + V_y^2 + V_z^2} \quad \text{Formula 2}$$

In addition, the square of a distance between the earth and the geo-center may be obtained by using an absolute location X, Y, Z:

$$x^2 + y^2 + z^2 = (R+h)^2 \quad \text{Formula 3}$$

For example, the default parameter is x, and y and z may also be obtained in a similar manner. The network side indicates information about y, z, Vx, Vy, and Vz. The absolute value of x may be obtained by using the following relationship:

$$|x| = \sqrt{(R+h)^2 - y^2 - z^2} = \sqrt{\left(G\frac{M}{(V)^2}\right)^2 - y^2 - z^2} \quad \text{Formula 4}$$

where $(V)^2 = V_x^2 + V_y^2 + V_z^2$.

For example, the default parameter is Vx, and Vy and Vz may also be obtained in a similar manner. The network side indicates information about x, y, z, Vx, Vy, and Vz. The absolute value of Vx may be obtained by using the following relationship:

$$|Vx| = \sqrt{\frac{GM}{R+h} - V_y^2 - V_z^2} = \sqrt{\frac{GM}{\sqrt{x^2+y^2+z^2}} - V_y^2 - V_z^2} \quad \text{Formula 5}$$

S503: Determine whether the default parameter is positive or negative, and obtain the complete six parameters in the ephemeris information.

The absolute value of the default parameter may be obtained through S502. This operation provides a method for determining whether the default parameter is positive or negative.

In a possible embodiment, a positive sign or a negative sign of x may be indicated in the first indication information.

The following describes in detail a possible embodiment of the first indication information, and details are not described herein.

In another possible embodiment, the terminal determines a positive or negative sign of the default parameter based on a location of the terminal. A terminal having a GNSS capability may obtain location information of the terminal. A satellite that can serve the terminal is generally located above the terminal. Therefore, it may be inferred that the positive or negative sign of the default parameter is consistent with a positive or negative sign of the location of the terminal. For example, if a parameter x of a current location of the terminal is positive, it is inferred that a parameter x of the satellite is also positive.

S504: Communicate with the network device based on the ephemeris information.

In an embodiment, a time or frequency offset is estimated based on a geographical location and the ephemeris information of the terminal. For example, the terminal determines a one-way delay or a round-trip delay based on a geographical location of the terminal and a location of the satellite in the ephemeris information, so as to obtain the time offset and determine a timing advance. A relative velocity between the terminal and the satellite is obtained based on the location of the terminal and the location and a velocity of the satellite, so as to determine a Doppler shift.

When sending an uplink signal to the network device, the terminal performs pre-compensation based on the determined time offset and/or the determined Doppler shift, to implement uplink synchronization.

In the foregoing embodiment, the terminal obtains five parameters of the ephemeris information sent by the network side, and then determines absolute values and whether the default parameter is positive or negative based on the five parameters, so as to communicate with the network device based on the complete ephemeris information. In comparison with receiving six parameters of the ephemeris information, indication overheads are reduced.

When the network side delivers the ephemeris information to the terminal, a specific parameter is default, so as to reduce indication overheads. The terminal needs to know which parameter the default parameter is and whether the parameter is positive or negative, so as to obtain the complete ephemeris information. The following describes how to indicate the default parameter.

In a possible embodiment, the default parameter is agreed on in a manner such as a protocol or a standard. For example, it is agreed that a parameter that occupies a maximum quantity of bits is the default parameter. In this embodiment, additional signaling overheads can be avoided.

In another possible embodiment, the network device sends the first indication information to the terminal, where the first indication information indicates the default parameter and/or whether the default parameter is positive or negative. Refer to Table 2. Table 2 shows a possible embodiment of the first indication information.

TABLE 2

Possible embodiment of the first indication information

| Manner | Bit | Indication | Default information |
|---|---|---|---|
| 1.1 | A1 | That A1 is default, A1 = 0, and A1 = 1 respectively indicate three parameters. | Parameter field |
| 1.2 | A2 | A2 = 0/1 respectively indicates positive or negative. | Default parameter |
| 1.3 | A1 A2 | That A1 is default, A1 = 0, and A = 1 respectively indicate three parameters; and A2 = 0/1 respectively indicates positive or negative. | Parameter field |
| 1.4 | A1 A2 | That A1 is default, A1 = 0, and A1 = 1 respectively indicate three parameters; and A2 = 0/1 respectively indicates a parameter field. | — |
| 1.5 | A1 A2 | A1 and A2 indicate default parameters of three parameters. | Parameter field |
| 1.6 | A1 A2 A3 | A1, A2, and A3 indicate default parameters of six parameters. | — |
| 1.7 | A1 A2 A3 | That A1 is default, A1 = 0, and A1 = 1 respectively indicate three parameters. A2 = 0/1 respectively indicates a parameter field. A3 = 0/1 respectively indicates positive or negative. | — |

TABLE 2-continued

Possible embodiment of the first indication information

| Manner | Bit | Indication | Default information |
|---|---|---|---|
| 1.8 | A1<br>A2<br>A3 | A1 and A2 indicate default parameters of three parameters.<br>A3 = 0/1 respectively indicates positive or negative. | Parameter field |
| 1.9 | A1<br>A2<br>A3<br>A4 | A1, A2, and A3 indicate default parameters of six parameters.<br>A4 = 0/1 respectively indicates positive or negative. | — |

The following separately describes the manner 1.1 to the manner 1.9 in Table 2.

Manner 1.1: For a default parameter field, one bit (A1) is used to indicate a default parameter in the default parameter field.

For example, when the default parameter field is a location, that A1 is default indicates that the default parameter is x. To be specific, if the first indication information is not sent, it indicates that the default parameter is x. The terminal detects whether an A1 field exists. If the A1 field does not exist, it indicates that A1 is default. For example, blind detection is performed according to different scrambling manners. A1=0 indicates that the default parameter is y. A1=1 indicates that the default parameter is z. In an embodiment, the default parameter field may also be a velocity. In this case, that A1 is default indicates that the default parameter is Vx, A1=0 indicates that the default parameter is Vy, and A1=1 indicates that the default parameter is Vz. It should be noted that a default parameter indicated by different values of A1 is not limited in this application. For example, A1=0 may also indicate that the default parameter is x or y.

In this manner, the default parameter field may further reduce signaling overheads.

It should be noted that, in the following, when a bit is set to default, 1, or 0 to indicate different information, similarly, blind detection may be performed in different scrambling manners. Details are not described in the following again.

In a possible embodiment, whether the default parameter is positive or negative indicated by the first indication information may be obtained through inference based on the location of the terminal.

Manner 1.2: For the default parameter, one bit is used to indicate whether the default parameter is positive or negative.

The default parameter is agreed on according to a protocol or a standard. When the value of the default parameter is close to 0, a positive or negative sign of a default value of the satellite may be inconsistent with the positive or negative sign of a value corresponding to a geographical location of a user, leading to false determination of the positive or negative sign. In this case, one bit may be used to indicate the positive or negative sign of the default value. For example, A1=0 indicates that the default parameter is positive, and A1=1 indicates that the default parameter is negative; or A1=0 indicates that the default parameter is positive, and A1=1 indicates that the default parameter is negative.

In this manner, the default parameter reduces indication overheads. In addition, one bit is used to indicate whether the default parameter is positive or negative, which avoids a case in which the terminal incorrectly determines whether the parameter is positive or negative.

Manner 1.3: For a default parameter field, one bit (A1) is used to indicate a default parameter in the default parameter field, and one bit (A2) is used to indicate whether the default parameter is positive or negative. Two bits need to be occupied in total.

The default parameter field is a location or a velocity. That is, the default parameter is one of x, y, or z, or the default parameter is one of Vx, Vy, or Vz.

For example, when the default parameter field is the location, that A1 is default indicates that the default parameter is z. In other words, if the first indication information is not sent, it indicates that the default parameter is z. A1=0 indicates that the default parameter is x. A1=1 indicates that the default parameter is y. A2=0 indicates that the default parameter is positive, and A2=1 indicates that the default parameter is negative; or A2=0 indicates that the default parameter is positive, and A2=1 indicates that the default parameter is negative.

It should be noted that a default parameter indicated by different values of A1 is not limited in this application. For example, A1=0 may also indicate that the default parameter is x or y. In addition, a sequence of the bits A1 and A2 is not limited, that is, A1 and A2 may be represented as A1 A2 or A2 A1.

In this manner, the default parameter field can reduce indication overheads. In addition, one bit is used to indicate whether the default parameter is positive or negative, which avoids a case in which the terminal incorrectly determines whether the parameter is positive or negative.

Manner 1.4: One bit (A1) is used to indicate a specific default parameter in a default parameter field, and one bit (A2) is used to indicate the default parameter field. Two bits need to be occupied in total.

For example, A2=0 indicates that a default parameter field is a location, or A2=1 indicates that a default parameter field is a velocity; or A2=0 indicates that a default parameter field is a velocity, and A2=1 indicates that a default parameter field is a location.

For example, when the default parameter field is a location, that A1 is default indicates that the default parameter is x. In other words, if the first indication information is not sent, it indicates that the default parameter is x. A1=0 indicates that the default parameter is y. A1=1 indicates that the default parameter is z. When the default parameter field is a velocity, that A1 is default indicates that the default parameter is Vx. In other words, if the first indication information is not sent, it indicates that the default parameter is Vx. A1=0 indicates that the default parameter is Vy. A1=1 indicates that the default parameter is Vz.

It should be noted that the default parameter indicated by different values of A1 is not limited in this application. For example, when the default parameter field is a location, A1=0 may alternatively indicate that the default parameter is x or y. When the default parameter field is a velocity, A1=0 may alternatively indicate that the default parameter is Vx or Vz. In addition, a sequence of the bits A1 and A2 is not limited, that is, A1 and A2 may be represented as A1 A2 or A2 A1.

In this manner, two bits are used to indicate the default parameter field and the default parameter. Indication overheads are reduced while the default parameter is flexibly indicated based on an actual situation.

In a possible embodiment, whether the default parameter is positive or negative indicated by the first indication information may be obtained through inference based on the location of the terminal.

Manner 1.5: For a default parameter field, two bits (A1 A2) are used to indicate a default parameter in the default parameter field.

The default parameter field is a location or a velocity. That is, the default parameter is one of x, y, or z, or the default parameter is one of Vx, Vy, or Vz.

For example, when the default parameter field is a location, and A1 A2=00, it indicates that the default parameter is x. A1 A2=01 indicates that the default parameter is y. A1 A2=10 indicates that the default parameter is z. When A1 A2=11, it may indicate any one of x, y, or z, or indicate no parameter. A relationship between a value of A1 A2 and a default parameter is not limited in this application. That is, when A1 A2=00, it may alternatively indicate that the default parameter is y or z, which is determined based on specific embodiment.

In this manner, the default parameter field is default, and two bits are used to indicate the default parameter, so that indication overheads can be reduced.

In a possible embodiment, whether the default parameter is positive or negative indicated by the first indication information may be obtained through inference based on the location of the terminal.

Manner 1.6: Three bits (A1 A2 A3) are used to indicate a default parameter.

For example, A1 A2 A3=000 indicates that the default parameter is x, A1 A2 A3=001 indicates that the default parameter is y, or A1 A2=010 indicates that the default parameter is z. A1 A2 A3=000 indicates that the default parameter is Vx, A1 A2 A3=001 indicates that the default parameter is Vy, or A1 A2 A3=010 indicates that the default parameter is Vz. When A1 A2 A3 is another value, it may indicate any one of the foregoing six parameters, or may indicate no parameter. A relationship between a value of A1 A2 A3 and a default parameter is not limited in this application. That is, when A1 A2 A3=00, it may alternatively indicate that the default parameter is y, z, Vx, Vy, or Vz, which is determined based on specific embodiment.

In this manner, a default parameter may be more flexibly indicated based on a quantity of bits occupied by a current location and a current velocity of the satellite.

In a possible embodiment, whether the default parameter is positive or negative indicated by the first indication information may be obtained through inference based on the location of the terminal.

Manner 1.7: One bit (A1) is used to indicate a default parameter in a default parameter field, one bit (A2) is used to indicate the default parameter field, and one bit (A3) is used to indicate whether the default parameter is positive or negative. Three bits need to be occupied in total.

For related descriptions of A1 and A2, refer to manner 4. Details are not described herein again.

A3=0 indicates that the default parameter is positive, and A3=1 indicates that the default parameter is negative; or A3=0 indicates that the default parameter is positive, and A3=1 indicates that the default parameter is negative.

A sequence of the bits A1 A2 A3 is not limited in this application. In other words, the sequence of the three bits may be A2 A1 A3, A1 A3 A2, A3 A1 A2, or A3 A2 A1, which is determined based on an actual design.

In this manner, three bits are used to indicate the default parameter field and the parameter, and indicate whether the default parameter is positive or negative as well. The default parameter may be flexibly indicated based on an actual situation, and accuracy of obtaining the default parameter by the terminal is ensured.

Manner 1.8: For a default parameter field by default, two bits (A1 A2) are used to indicate a default parameter in three parameters, and one bit (A3) is used to indicate whether the default parameter is positive or negative. Three bits need to be occupied in total.

For related descriptions of A1 and A2, refer to manner 5. Details are not described herein again.

For a related description of A3, refer to manner 7. Details are not described herein again.

A sequence of the bits A1 A2 A3 is not limited in this application. In other words, the sequence of the three bits may be A2 A1 A3, A3 A1 A2, A3 A2 A1, or the like. This is determined based on an actual design.

In this manner, the default parameter field is default, so that signaling overheads can be reduced, and whether the default parameter is positive or negative is indicated, thereby improving accuracy of determining whether the default parameter is positive or negative by the terminal.

Manner 1.9: Three bits (A1 A2 A3) are used to indicate a default parameter, and one bit (A4) is used to indicate whether the default parameter is positive or negative.

For related descriptions of A1A2 A3, refer to manner 6. Details are not described herein again.

A4=0 indicates that the default parameter is positive, and A4=1 indicates that the default parameter is negative; or A4=0 indicates that the default parameter is positive, and A4=1 indicates that the default parameter is negative.

A sequence of the bits A1 A2 A3 A4 is not limited in this application. In other words, the sequence of the four bits may be A4 A1 A2 A3, A3 A1 A2 A4, A3 A2 A1 A4, or the like. This is determined based on an actual design.

In this manner, the default parameter may be more flexibly indicated based on a quantity of bits occupied by a current location and a current velocity of a satellite, and whether the default parameter is positive or negative is indicated, thereby improving accuracy of determining whether the default parameter is positive or negative by the terminal.

In the foregoing example manner, at least a default manner is used, and a maximum of four bits are used to indicate the default parameter and/or whether the default parameter is positive or negative. In comparison with the prior art in which all parameters are sent (where for example, each parameter in Table 1 occupies at least 20 bits), indication overheads are reduced.

It should be noted that signaling overheads, flexibility, and processing complexity of a receive end in the foregoing nine manners are different, and may be considered based on an actual situation. In addition to the foregoing nine manners, there may be another method for indicating the default parameter and/or whether the default parameter is positive or negative by using the first indication information. This is not limited in this application.

In an embodiment of this application, when the network side indicates the ephemeris information to the terminal, one or more parameters are default, and the terminal learns of the default parameter and/or whether the default parameter is positive or negative by default or by obtaining the first indication information. In comparison with sending all parameters of the ephemeris information, signaling overheads are reduced.

Figure 6:
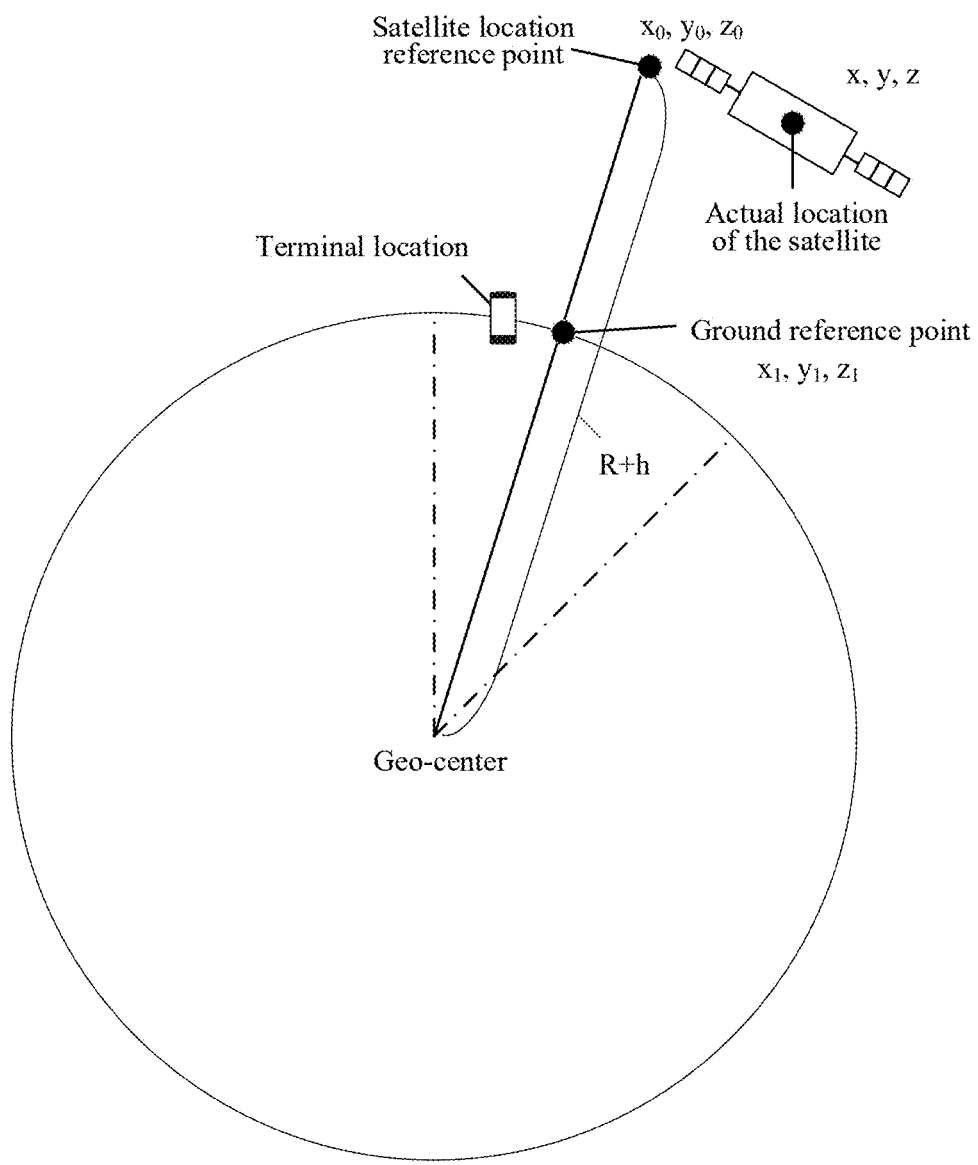
FIG. 6 is a schematic diagram of a location reference point in a wireless communication method according to an embodiment of this application.

In another embodiment provided in this application, the foregoing method for indicating ephemeris information with one or more default parameters is also applicable to a scenario in which a location reference point is used. In this scenario, ephemeris information indicated by a network side is a difference value between a satellite location and a location reference point. FIG. 6 is a schematic diagram of a location reference point in a wireless communication method according to this embodiment of this application.

The satellite location reference point is (x0, y0, z0), and may also be referred to as a spatial location reference point. An intersection point between the connection line between the spatial location reference point and the geo-center and the earth surface is a ground reference point ($x_1$, $y_1$, $z_1$). In other words, the spatial location reference point is a reference point that is obtained from a connection line between the ground reference point ($x_1$, $y_1$, $z_1$) and the geo-center that extends for a distance R+h from the geo-center, where h is a height of the satellite to the ground.

An actual location of the satellite is (x, y, z). The network side delivers a difference value between the actual location of the satellite and a location of the reference point to the terminal as location parameters x', y', and z' of ephemeris information. FIG. 6 is used as an example. The difference value between the actual location of the satellite and the location of the reference point delivered by the network side to the terminal is that x'=x−$x_0$, y'=y−$y_0$, z'=z−$z_0$.

Figure 7:
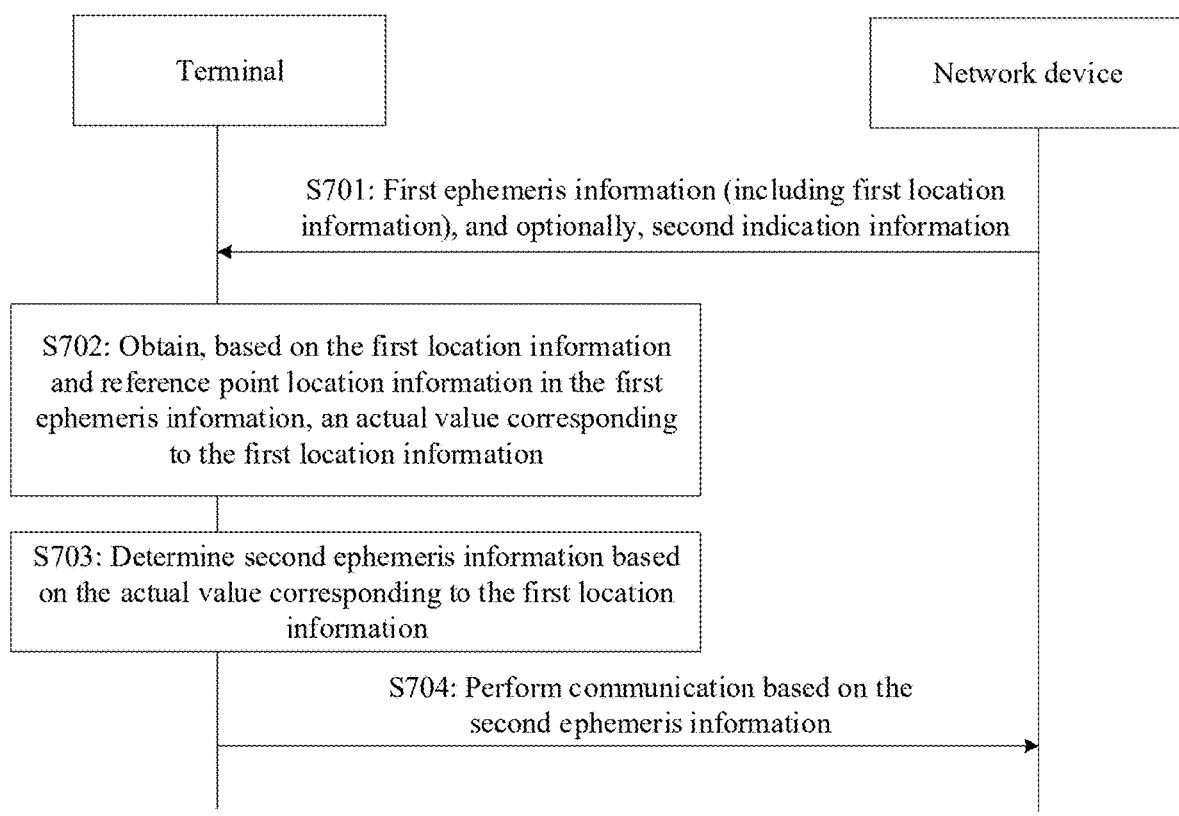
FIG. 7 is a schematic diagram of interaction of a communication method according to an embodiment of this application.

FIG. 7 is a schematic diagram of interaction of a communication method according to an embodiment of this application.

In operation S701, a network device sends first ephemeris information to a terminal, and correspondingly, the terminal receives the first ephemeris information sent by the network device.

The first ephemeris information includes first location information. The first location information is a difference value relative to a location of a first reference point. The location of the first reference point is a location of a spatial reference point, for example, ($x_0$, $y_0$, $z_0$) in FIG. 6. The first location information is x'=x−x0, y'=y−y0, and z'=z−z0. The first ephemeris information further includes first velocity information.

In an embodiment, the network device further sends second indication information to the terminal, where the second indication information is used to obtain an actual value corresponding to the first location information.

In operation S702, the terminal obtains, based on the first location information and reference point location information in the first ephemeris information, the actual value corresponding to the first location information.

The reference point location information is location information of the first reference point or location information of a second reference point. The location information of the first reference point is information about a spatial reference point (for example, ($x_0$, $y_0$, $z_0$) in FIG. 6), and the location information of the second reference point is information about a ground reference point (for example, ($x_1$, $y_1$, $z_1$) in FIG. 6).

In a possible embodiment, the reference point location information is indicated by using second indication information. The second indication information includes the location information of the first reference point (location information of the spatial reference point), or includes location information of the second reference point (location information of the ground reference point). The reference point may alternatively be a point on a satellite service link. The reference point indicated by the second indication information may also be a reference point in another application, for example, a corresponding reference point used for frequency pre-compensation performed by a satellite on a downlink signal, or a reference point used by a user to send an uplink signal for time synchronization. Distances from these reference points to the satellite are shorter than distances from the geo-center to the satellite, and indication overheads can be reduced by using difference information of the reference points for indication.

In another possible embodiment, the reference point location information is determined in advance by using a method such as a protocol or a standard specification. For example, different ground location ranges of the earth are planned in advance, and a ground reference point is set for each location range. For example, the location range is divided based on longitude and latitude, and a location of the ground reference point may be a center of the divided location range. In this case, the terminal obtains, based on the location of the terminal, location information of the ground reference point in an area in which the terminal is located. For another example, a location range is divided based on a cell or a beam. Each cell has one ground reference point, and the ground reference point may be a cell center or a beam center. In this case, there is a mapping relationship between the ground reference point and a cell identifier or a beam identifier. The terminal obtains location information of the ground reference point based on the identifier of a current cell or the identifier of a current beam. For another example, the satellite orbit is divided into different ranges, and a reference point is selected for space areas in different ranges according to a manner of averaging longitudes and latitudes.

When the reference point location information is the location information of the first reference point (e.g., spatial reference point), the actual value corresponding to the first location information is a value obtained based on a value of the location of the first reference point and the first location information included in the first ephemeris information. Specifically, the actual value corresponding to the first location information is obtained by adding the value of the location of the first reference point and the first location information included in the first ephemeris information. For example, as shown in FIG. 6, the actual values corresponding to the first location information are x=x'+$x_0$, y=y'+$y_0$, and z=z'+$z_0$.

When the reference point location information is the location information of the second reference point (e.g., ground reference point), the actual value corresponding to the first location information is a value obtained based on a location of the second reference point, the first velocity information included in the first ephemeris information, and the first location information included in the first ephemeris information. The first velocity information included in the first ephemeris information may be used to obtain a distance between a satellite (network device) and the geo-center. Specifically, the distance may be obtained according to the foregoing formula 2. The distance between the satellite and the geo-center is used to obtain the location of the first reference point based on the location information of the second reference point.

For example, as shown in FIG. 6, the actual values corresponding to the first location information are x=x'+$x_0$, y=y'+$y_0$, and z=z'+$z_0$. The spatial location reference point ($x_0$, $y_0$, $z_0$) is a reference point that is obtained from a connection line between the ground reference point ($x_1$, $y_1$, $z_1$) and the geo-center that extends for a distance R+h from the geo-center, where $$R + h = \frac{GM}{V^2} = \frac{GM}{V_x^2 + V_y^2 + V_z^2}.$$

The spatial reference point $(x_0, y_0, z_0)$ may be obtained by using the following formula:

$$x_0^2 + y_0^2 + z_0^2 = (R+h)^2 = \left(\frac{GM}{V_x^2 + V_y^2 + V_z^2}\right)^2$$

$$\frac{x_0}{x_1} = \frac{y_0}{y_1} = \frac{z_0}{z_1}$$

$V_x^2 + V_y^2 + V_z^2$, may be obtained based on the first velocity information.

In operation S703, the terminal determines the second ephemeris information based on the actual value corresponding to the first location information of the satellite.

In an embodiment, the terminal determines three parameters of the location information and three parameters of the velocity information in the second ephemeris information based on the actual value corresponding to the first location information and the first velocity information in the first ephemeris information.

In a possible embodiment, if the first location information included in the first ephemeris information is different values of three location parameters, and the first velocity information includes information about three velocity parameters, the second ephemeris information is actual values of the three location parameters corresponding to the first location information and values of the three velocity parameters corresponding to the first velocity information. FIG. 6 is used as an example. The first ephemeris information includes information about a first location (x', y', z') and information about a first velocity (Vx, Vy, Vz), actual values corresponding to the first location information are x, y, and z, and the second ephemeris information includes x, y, and z, and Vx, Vy, and Vz.

In a possible embodiment, the first location information and the first velocity information that are included in the first ephemeris information is information about m parameters in n parameters. In other words, the actual value corresponding to the first location information in the first ephemeris information and the first velocity information are the m parameters in the n parameters. The terminal determines the values of the default n−m parameters by using the methods shown in FIG. 4 and FIG. 5, so as to determine values of the n parameters in the second ephemeris information. In an embodiment, a parameter in the first location information may be default. A default location parameter x in FIG. 6 is used as an example. The first ephemeris information includes information about (y', z') and information about a first velocity (Vx, Vy, Vz), and actual values corresponding to the first location information are y and z. The second ephemeris information is obtained based on y and z and Vx, Vy, and Vz, and the second ephemeris information includes x, y, and z, and Vx, Vy, and Vz. In an embodiment, a parameter in the first velocity information may be default. A default location parameter Vy in FIG. 6 is used as an example. The first ephemeris information includes information about a first location (x', y', z') and information about a first velocity (Vx, Vz), and actual values corresponding to the first location information are x, y, and z. The second ephemeris information is obtained based on x, y, and z and Vx and Vz, and the second ephemeris information includes x, y, and z, and Vx, Vy, and Vz. In this embodiment, the location information in the first ephemeris information is represented by using the difference value of the reference point, so that signaling overheads can be reduced. On this basis, the parameter in the velocity information is default, so that signaling overheads can be further reduced.

It should be noted that the foregoing operations S702 and S703 may be combined into one operation, to be specific, the terminal determines the second ephemeris information based on the first location information and the reference point location information in the first ephemeris information.

In a possible embodiment, the first location information and the first velocity information that are included in the first ephemeris information is the information about m parameters in the n parameters. When the first location information is the difference value based on the location of the reference point, based on a relationship between the difference value, the location information of the reference point, and the actual value corresponding to the first location information, the actual value corresponding to the first location information is represented by using the location information of the reference point and the difference value, and the actual values of the default n−m parameters are obtained by using a constraint condition such as the law of universal gravitation. The default location parameter x in FIG. 6 is used as an example. The first ephemeris information includes information about (y', z') and information about the first velocity (Vx, Vy, Vz). In this case, actual values corresponding to the first location information may be represented as y=y'+y_0, and z=z'+z_0. An absolute value of the default location parameter x may be obtained by substituting the actual values and the first velocity into the foregoing formula 4:

$$|x| = \sqrt{(R+h)^2 - y^2 - z^2} = \sqrt{\left(G\frac{M}{V_x^2 + V_y^2 + V_z^2}\right)^2 (y' + y_0)^2 - (z' + z_0)^2}$$

The terminal determines whether the default parameter x is positive or negative by using the location information of the terminal or the first indication information, to obtain complete second ephemeris information, where the complete second ephemeris information includes x, y, and z, and Vx, Vy, and Vz.

In operation S704, the terminal performs communication based on the second ephemeris information.

For this operation, refer to the descriptions in S403 and S504. Details are not described herein again.

In the wireless communication method shown in FIG. 7, a network side indicates a difference value between an actual satellite location and a space reference point to a terminal. Because the space reference point is relatively close to the satellite, an absolute value of the difference value is relatively small, and a quantity of bits that need to be occupied is relatively small, thereby reducing indication signaling overheads. On this basis, indication overheads may be further reduced with reference to the indication manners of default parameters shown in FIG. 4 and FIG. 5.

In another embodiment provided in this application, the foregoing method for indicating ephemeris information of one or more parameters by default and/or the method for indicating a difference value of a reference point are/is also applicable to a case in which the reference value and the relative value are used to indicate the location information and the velocity information. When a satellite moves to some locations, a difference between different location parameters or a difference between different velocity parameters is relatively small. In this case, a manner of using a reference value and a relative value based on the reference value can greatly reduce indication overheads. The location information is used as an example. When x=6500 km, y=6550 km, and z=6500 km, if x is used as the reference value to indicate an actual location of the satellite, the location information included in the ephemeris information sent by the network device to the terminal may be x'=6500, y'=y−x=50, and z'=z−x=0. Parameters y' and z' are far less than y and z. Similarly, the velocity information may also be indicated in this manner.

In some cases, a difference between different location parameters or a difference between different velocity parameters is large, or even greater than an actual value of each parameter. The velocity information is used as an example. Vx=−4, Vy=5, and Vz=7. If Vy is used as the reference value, location information included in ephemeris information sent by the network device to the terminal may be Vx'=Vx−Vy=−9, Vy'=5, and Vz'=Vz−Vy=2. Overheads for indicating Vx', Vy', and Vz' are greater than overheads for directly indicating Vx, Vy, and Vz. For this problem, the network device may flexibly select an indication manner based on an actual situation.

Figure 8:
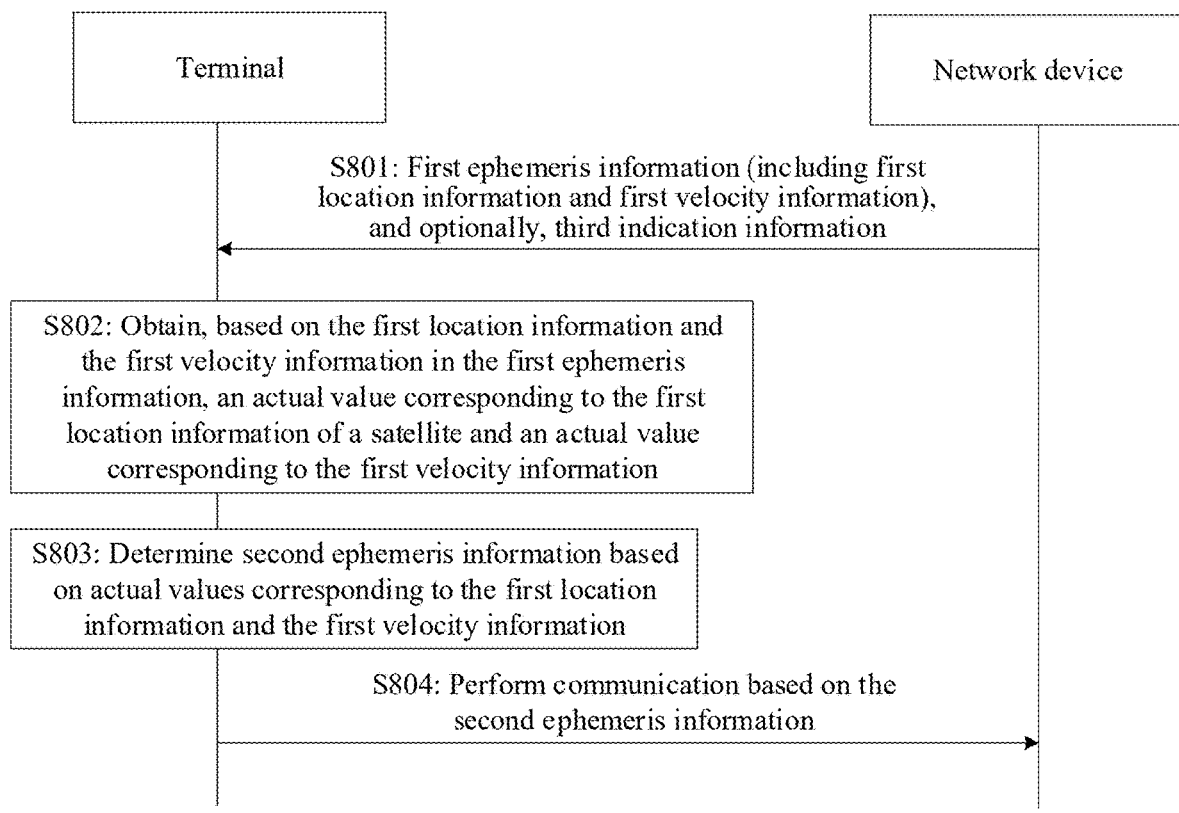
FIG. 8 is a schematic diagram of interaction of a communication method according to an embodiment of this application.

FIG. 8 is a schematic diagram of interaction of a communication method according to an embodiment of this application.

In operation S801, a network device sends first ephemeris information to a terminal, and correspondingly, the terminal receives the first ephemeris information sent by the network device.

The first ephemeris information includes first location information and first velocity information. One piece of first location parameter information in the first location information is a location reference value, and another piece of first location parameter information is a location relative value based on the location reference value; and/or one piece of first velocity parameter information in the first velocity information is a velocity reference value and another piece of first velocity parameter information is a velocity relative value based on the velocity reference value.

In a possible embodiment, the location parameter used as the location reference value is a location parameter that occupies a maximum quantity of bits. In an embodiment, a default reference value may be specified in a protocol. In an embodiment, different location parameters are used as reference values in different geographical ranges.

In an embodiment, the network device further sends third indication information to the terminal, where the third indication information includes a location and/or velocity indication manner in the first ephemeris information. In a possible embodiment, the third indication information is a differential mode identifier (Differential mode flag) field.

In operation S802, the terminal obtains, based on the first location information and the first velocity information in the first ephemeris information, an actual value corresponding to the first location information of a satellite and an actual value corresponding to the first velocity information.

In an embodiment, the terminal determines, based on the location reference value in the first location information and the location relative value based on the location reference value, the actual value corresponding to the first location information; and/or determines, based on the velocity reference value in the first velocity information and the velocity relative value based on the velocity reference value, the actual value corresponding to the first velocity information.

For example, the location reference value in the first location information is an actual value corresponding to the parameter used as the location reference value, and an actual value of a parameter corresponding to the location relative value is a sum of the location reference value and the location relative value. For example, a location parameter x is used as the reference value. The first location information in the first ephemeris information received by the terminal is x', y', and z', where x'=x, y'=y−x, and z'=z−x. In this case, actual values corresponding to the first location information determined by the terminal is x=x', y=x'+y', and z=x'+z'. In the first velocity information, the velocity reference value is an actual value corresponding to the parameter used as the velocity reference value, and an actual value of a parameter corresponding to the velocity relative value is a sum of the velocity reference value and the velocity relative value. For example, the velocity parameter Vy is used as the reference value. The first velocity information in the first ephemeris information received by the terminal is Vx', Vy', and Vz', where Vx'=Vx−Vy, Vy'=Vy, and Vz'=Vz−Vy. In this case, actual values corresponding to the first velocity information determined by the terminal are Vx=Vx'+Vy', Vy=Vy', and Vz=Vy'+Vz'.

In a possible embodiment, whether a manner of indicating the location information and the velocity information by using the reference value is applied and the relative value and a parameter used as reference may be pre-specified in a protocol or a standard.

In another possible embodiment, the terminal obtains the third indication information, where the third indication information includes the indication manner of the location and/or the velocity in the first ephemeris information, and includes whether to use the indication manner of using the relative value and/or an indication of the parameter used as the reference value.

The following describes in detail a possible embodiment of the third indication information, and details are not described herein.

In operation S803, the terminal determines second ephemeris information based on actual values corresponding to the first location information and the first velocity information.

Specifically, the terminal determines three parameters of the location information and three parameters of velocity information in the second ephemeris information based on the actual values corresponding to the first location information and the actual values corresponding to the first velocity information.

In a possible embodiment, the first ephemeris information includes information about the three parameters of the first location information and information about the three parameters of the first velocity information, and the second ephemeris information is actual values of three location parameters corresponding to the first location information and values of three velocity parameters corresponding to the first velocity information. For example, when both the location information and the velocity information are represented by using relative representation, a reference value in the location information is x, a reference value in the velocity information is Vy, the first location information in the first ephemeris information is x', y', and z', where x'=x, y'=y−x, and z'=z−x, and the first velocity information is Vx', Vy', Vz', where Vx'=Vx−Vy, Vy'=Vy, and Vz'=Vz−Vy, the second ephemeris information determined by the terminal is x=x', y=x'+y', and z=x'+z', and Vx=Vx'+Vy', Vy=Vy', and Vz=Vy'+Vz'.

In another possible embodiment, the first location information and the first velocity information that are included in the first ephemeris information is the information about m parameters in n parameters. In other words, the actual value corresponding to the first location information in the first ephemeris information and the actual value corresponding to the first velocity information are the m parameters in the n parameters. That the terminal determines second ephemeris information based on actual values corresponding to the first location information and the first velocity information includes: The terminal determines the actual values of the m parameters based on the first location information and the first velocity information, and determines the values of default n−m parameters by using the methods shown in FIG. 4 and FIG. 5, so as to determine values of the n parameters in the second ephemeris information.

For example, when n−m=1, a default parameter is x, both the location information and the velocity information are represented by using relative representation, a reference value in the location information is y, and a reference value in the velocity information is Vy, the first location information in the first ephemeris information is y' and z', where y'=y, z'=z−y, and the first velocity information is Vx', Vy', and Vz', where Vx'=Vx−Vy, Vy'=Vy, and Vz'=Vz−Vy, the terminal determines that actual values corresponding to the first location information and the first velocity information in the first ephemeris information is y=y', z=y'+z', Vx=Vx'+Vy', Vy=Vy', and Vz=Vy'+Vz', and determines the default parameter x based on the foregoing y, z, Vx, Vy, and Vz according to the law of universal gravitation.

It should be noted that the foregoing operations S802 and S803 may be combined into one operation, to be specific, the terminal determines the second ephemeris information based on the first location information and the reference point location information in the first ephemeris information.

In a possible embodiment, the first location information and the first velocity information that are included in the first ephemeris information is information about m parameters in n parameters. When the first location information and/or the first velocity information is represented in a form of a reference value and a relative value, actual values corresponding to the first location information and/or the first velocity information are represented by the reference value of the first location information and/or the first velocity information and the corresponding relative value thereof based on a relationship between the reference value of the first location information and/or the first velocity information and the corresponding relative value thereof, and actual values of n−m default parameters are obtained based on constraint conditions such as the law of universal gravitation.

For example, the default parameter is x, both the location information and the velocity information are represented by using relative representation, the reference value in the location information is y, and the reference value in the velocity information is Vy. The first ephemeris information includes information about (y', z') and information about a first velocity (Vx', Vy', Vz'), where y'=y, z'=z−y, Vx'=Vx−Vy, Vy'=Vy, Vz'=Vz−Vy, so that the actual values corresponding to the first location information and the first velocity information may be represented as y=y' and z=y'+z', and Vx=Vx'+Vy', Vy=Vy', and Vz=Vy'+Vz'. A default absolute value of the parameter x may be obtained by substituting the actual values and the first velocity into the foregoing formula 4:

$$|x| = \sqrt{(R+H)^2 - y^2 - z^2} = \sqrt{\left(G\frac{M}{(Vx' + Vy')^2 + (Vy')^2 + (Vy' + Vz')^2}\right)^2 - (y')^2 - (z' + y')^2}$$

The terminal determines whether the default parameter x is positive or negative by using the location information of the terminal or the first indication information, to obtain complete second ephemeris information, where the complete second ephemeris information includes x, y, and z, and Vx, Vy, and Vz.

In operation S804, the terminal performs communication based on the second ephemeris information.

For this operation, refer to the descriptions in S403 and S504. Details are not described herein again.

The following describes in detail possible embodiments of the third indication information. Refer to Table 3. Table 3 shows possible embodiments of the third indication information.

TABLE 3

Possible embodiments of the third indication information

| Manner | Bit | Indication | Default information |
|---|---|---|---|
| 3.1 | B1 | The B1 bit indicates a relative value. When the B1 bit is default, it indicates that the relative value is not used. | A parameter used as a reference value and a parameter field corresponding to the relative value when relative representation is used |
| 3.2 | B1 | B1 = 0 indicates that a relative value is not used. B1 = 1 indicates that a relative value is used for a location, or a relative value is used for a velocity, or relative values are used for both of a location and a velocity. | A parameter used as a reference value and a parameter field corresponding to the relative value when relative representation is used |
| 3.3 | B1 B2 | B1 = 0/1 indicates whether to use a manner of relative value. That B2 is default, B2 = 0, and B2 = 1 respectively indicate parameters that are used as reference values in a location or velocity field. | Parameter field corresponding to the relative value, and an indicated parameter of the reference value when B2 is default |

TABLE 3-continued

Possible embodiments of the third indication information

| Manner | Bit | Indication | Default information |
|---|---|---|---|
| 3.4 | B1 B2 | B1 = 0/1 indicates whether to use a manner of relative value for indicating a location. B2 = 0/1 indicates whether to use a manner of relative value for indicating a velocity. | Parameter used as the reference value when relative representation is used |
| 3.5 | B1 B2 B3 | B1 = 0/1 indicates whether to use a manner of relative value for indicating a location. B2-0/1 indicates whether to use a manner of relative value for indicating a velocity. That B3 is default, B3 = 0, and B3 = 1 respectively indicate parameters that are used as reference values in a location or velocity field. | An indicated parameter of the reference value when B3 is default. |
| 3.6 | B1 B2 B3 | B1 = 0/1 indicates whether to use a manner of relative value. B2 and B3 indicate parameters that are used as reference values in a location or velocity field. | A parameter field corresponding to the relative value |
| 3.7 | B1 B2 B3 B4 | B1 = 0/1 indicates whether to use a manner of relative value for indicating a location. B2 = 0/1 indicates whether to use a manner of relative value for indicating a velocity. B2 and B3 indicate parameters that are used as reference values in a location or velocity field. | — |
| 3.8 | B1 B2 B3 B4 | B1 B2 B3 B4 indicates 16 cases, for example, a relative value is not used, a location reference value is not used, a velocity reference value is not used, or a location reference value and a velocity reference value are not used. | — |

The following separately describes manner 3.1 to manner 3.8 in Table 3.

Manner 3.1: One bit (B1) is used to represent that a relative value is used, and that the bit is default indicates that the relative value is not used. A parameter field corresponding to the relative value is default, and a parameter used as a reference value is indicated when relative representation is used.

When the bit B1 exists, it indicates that the relative value is used. It may be default that the relative value may be used for the location information, or the relative value may be used for the velocity information, or the relative values may be used for both the location information and the velocity information. In addition, the parameter used as the reference value is default when relative representation is used. For example, it is default that the satellite information uses a relative value, and the location parameter x is used as a reference value; or both the location and the velocity use the relative values, and the location parameter y and the velocity parameter Vy are used as reference values.

In a possible embodiment, when the relative value is used, B1=0 indicates that the parameter field using the relative value is the location, and B1=1 indicates that the parameter field using the relative value is the velocity; or B1=1 indicates that the parameter field using the relative value is the location, and B1=0 indicates that the parameter field using the relative value is the velocity.

In manner 3.1, one bit indicates that the relative value is used. When the relative value is not used, the one bit is default, so that signaling overheads can be reduced.

Manner 3.2: One bit (B1) is used to indicate whether a relative value is used. A parameter field corresponding to the relative value is default, and a parameter used as a reference value is indicated when relative representation is used.

For example, B1=0 indicates that no relative value is used, and B1=1 indicates that a relative value is used; or B1=0 indicates that a relative value is used, and B1=1 indicates that no relative value is used.

When B1 indicates that the relative value is used, it may be default that the relative value may be used for the location information, or the relative value may be used for the velocity information, or the relative values may be used for both the location information and the velocity information. In addition, the parameter used as the reference value is default when relative representation is used. For example, it is default that the satellite information uses a relative value, and the location parameter x is used as a reference value, or it is default that the velocity uses a relative value, and the velocity parameter z is used as a reference value, or it is default that both the location and the velocity use the relative values, and the location parameter y and the velocity parameter Vy are used as reference values.

In manner 3.2, one bit indicates whether the relative value is used, and the parameter field using the relative value and a parameter used as the reference value are default, so that signaling overheads can be reduced.

Manner 3.3: One bit (B1) is used to indicate whether a relative value is used, and one bit (B2) is used to indicate a parameter used as a reference value. When the relative value is used, a parameter field is default, and two bits need to be occupied.

Manner 3.3 may be considered as using one additional bit (B2) to indicate the parameter as the reference value based on manner 3.1 or manner 3.2.

In a possible embodiment, B1=0 indicates that no relative value is used, and B1=1 indicates that a relative value is used; or B1=0 indicates that a relative value is used, and B1=1 indicates that no relative value is used. B1 indicates that when the relative value is used for indication, a parameter field corresponding to the relative value may be default. For example, a relative value is used for the location by default; a relative value is used for the velocity by default; or relative values are used for both the location and the velocity by default.

In another possible embodiment, when the bit B1 exists, it indicates that the relative value is used. It may be default that the relative value may be used for the location information, or the relative value may be used for the velocity information, or the relative values may be used for both the location information and the velocity information. In an embodiment, when the relative value is used, B1=0 indicates that the parameter field using the relative value is the location, and B1=1 indicates that the parameter field using the relative value is the velocity; or B1=1 indicates that the parameter field using the relative value is the location, and B1=0 indicates that the parameter field using the relative value is the velocity.

B2 indicates the parameter as the reference value. For example, that B2 is default indicates x and/or Vx is the reference value; B2=0 indicates that y and/or Vy is the reference value; or B2=1 indicates that z and/or Vz is the reference value. This application does not limit a reference value parameter represented when B2 is default or has different values. For example, when B1 indicates that a relative value is used for a location or that a relative value is used for a location by default, B2=1 may alternatively indicate that the reference value is x or y. When B1 indicates that a relative value is used for the velocity or that a relative value is used for the velocity by default, B2=0 may also indicate that the reference value is x or z.

In a possible embodiment, when B1 indicates that a relative value is used for both the velocity and the location, or that relative values are used for both the velocity and the location by default, that B2 is default, B2=0, and B2=1 respectively indicate that x and Vx are used as reference values, y and Vy are used as reference values, and z and Vz are used as one of the reference values.

It should be noted that, when B1 is default or when B1 indicates that no relative value is used for indication, B2 may be default, or B2 is used as a reserved field for another application. In addition, a sequence of B1 and B2 is not limited in this application.

In manner 3.3, two bits are used to indicate whether to use the relative value and the parameter used as the reference value. On the basis of reducing indication overheads, the parameter used as the reference value is more flexibly indicated based on a quantity of bits that need to be occupied by each parameter.

Manner 3.4: One bit (B1) is used to indicate whether a relative value is used for a location, and one bit (B2) is used to indicate whether a relative value is used for a velocity. A parameter as a reference value is default when relative representation is used.

B1=0 indicates that the relative value is not used for location information, and B1=1 indicates that the relative value is used for the location information; or B1=0 indicates that the relative value is used for the location information, and B1=1 indicates that the relative value is not used for location information. B2=0 indicates that the relative value is not used for velocity information, and B2=1 indicates that the relative value is used for the velocity information; or B2=0 indicates that the relative value is used for velocity information, and B2=1 indicates that the relative value is not used for the velocity information.

When B1 indicates that the relative value is used for the location information, one of x, y, and z is used as a reference value by default. When B2 indicates that the relative value is used for the velocity information, one of Vx, Vy, and Vz is used as a reference value by default.

It should be noted that a sequence of B1 and B2 is not limited in this application.

In manner 3.4, two bits are used to separately indicate whether the relative values are used for the location information and the velocity information, so that an indication manner of the location information and the velocity information can be flexibly processed on a basis that indication overheads are reduced.

Manner 3.5: One bit (B1) is used to indicate whether a relative value is used for a location, one bit (B2) is used to indicate whether a relative value is used for a velocity, and one bit (B3) is used to indicate a parameter as a reference value. Three bits need to be occupied in total.

B1=0 indicates that the relative value is not used for location information, and B1=1 indicates that the relative value is used for the location information; or B1=0 indicates that the relative value is used for the location information, and B1=1 indicates that the relative value is not used for location information. B2=0 indicates that the relative value is not used for velocity information, and B2=1 indicates that the relative value is used for the velocity information; or B2=0 indicates that the relative value is used for velocity information, and B2=1 indicates that the relative value is not used for the velocity information.

B3 is used to indicate the parameter as the reference value. For example, that B2 is default indicates x and/or Vx is the reference value; B2=0 indicates that y and/or Vy is the reference value; or B2=1 indicates that z and/or Vz is the reference value. This application does not limit a reference value parameter represented when B2 is default or has different values.

In a possible embodiment, when B1 indicates that the relative value is used for the location and B2 indicates that the relative value is not used for a velocity, B3 is used to indicate the location parameter used as a reference value, and that B3 is default, B3=0, and B3=1 respectively indicate that one of the location parameters x, y, and z is used as the reference value. When B1 indicates that the relative value is not used for the location and B2 indicates that the relative value is used for the velocity, B3 is used to indicate a velocity parameter used as the reference value, and that B3 is default, B3=0, and B3=1 respectively indicate that one of the location parameters Vx, Vy, and Vz is used as the reference value. When B1 indicates that the relative value is used for the location and B2 also indicates that the relative value is used for the velocity, B3 is used to indicate the location and the velocity parameter that are used as the reference values, and that B3 is default, B3=0, and B3=1 respectively indicate that one of location parameter x and Vx, location parameter y and Vy, and location parameter z and Vz are used as a reference value. When B1 indicates that the relative value is not used for the location and B2 also indicates that the relative value is not used for the velocity, B3 is default or B3 is used as a reserved field for another application.

It should be noted that when both the velocity and the location are represented by using relative representation, a combination manner of x and Vx, y and Vy, and z and Vz is direct, and complexity is low. However, a method for indicating a parameter of a reference value by B3 may also be another combination. For example, that B3 is default, B3=0, and B3=1 respectively indicate that one of the location parameter x and Vy, the location parameter y and Vz, and the location parameter z and Vx is used as a reference value. This is not limited in this application. In addition, a sequence of B1, B2, and B3 is not limited in this application.

In manner 3.5, two bits are used to separately indicate whether the location information and the velocity information use the relative value, and one more bit is used to indicate the parameter used as the reference value. Therefore, an indication manner of the location information and the velocity information can be more flexibly processed based on an actual quantity of bits occupied by the location information and the velocity information.

Manner 3.6: One bit (B1) is used to indicate whether a relative value is used, and two bits (B2 B3) are used to indicate a parameter used as a reference value. When the relative value is used, a parameter field is default, and three bits need to be occupied.

Manner 3.3 may be considered as using two additional bit (B2 and B3) to indicate the parameter as the reference value based on manner 3.1 or manner 3.2.

For a possible embodiment related to B1, refer to manner 3.1, 3.2, or 3.3. Details are not described herein again.

B2 B3 indicates a parameter used as a reference value. For example, when a parameter field using the relative value is the location, B2 B3=00 indicates that x is used as a reference value, B2 B3=01 indicates that y is used as a reference value, B2 B3=10 indicates that z is used as a reference value, and B2 B3=11 indicates that one of x, y, and z is used as a reference value or may be used for another application. When both the location and the velocity use the relative values, B2 B3=00 indicates that x and Vx are used as reference values, B2 B3=01 indicates that y and Vy are used as reference values, B2 B3=10 indicates that z and Vz are used as reference values, and B2 B3=11 indicates that one of x and Vx, y and Vy, and z and Vz are used as reference values or may be used for another application.

It should be noted that when both the velocity and the location are represented by using relative representation, a manner in which x and Vx, y and Vy, and z and Vz are used as a combination for indication is direct, and complexity is low. However, a method in which B2 B3 indicates a parameter used as a reference value may also be another combination. This is not limited in this application.

In manner 3.6, one bit (B1) is used to indicate whether a relative value is used, and two bits (B2 B3) are used to indicate a parameter used as a reference value. When the relative value is used, a parameter field is default. In this way, whether to use the relative value and a parameter used as the reference value can be determined based on a quantity of bits occupied by actual location and velocity information.

Manner 3.7: One bit (B1) is used to indicate whether a relative value is used for a location, one bit (B2) is used to indicate whether a relative value is used for a velocity, and two bits (B3 B4) is used to indicate a parameter as a reference value. Four bits need to be occupied in total.

For possible embodiments of B1 and B2, refer to manner 3.5. Details are not described herein again.

In a possible embodiment, when B1 indicates that a relative value is used for a location and B2 indicates that a relative value is not used for a velocity, B3 B4 is used to indicate a location parameter used as a reference value. Three values of B3 B4=00, B3 B4=01, B3 B4=10, and B3 B4=11 may be respectively indicated that one of x, y, and z is used as a reference value, and a fourth value may indicate that one of x, y, and z is used as a reference value or may be used for another application. When B1 indicates that a relative value is not used for a location and B2 indicates that a relative value is used for a velocity, B3 and B4 are used to indicate a velocity parameter used as a reference value. Three values of B3 B4=00, B3 B4=01, B3 B4=10, and B3 B4=11 may respectively indicate that one of Vx, Vy, and Vz is used as a reference value, and a fourth value may indicate that one of Vx, Vy, and Vz is used as a reference value or may be used for another application. When B1 indicates that a relative value is used for a location and B2 also indicates that a relative value is used for a velocity, B3 B4 is used to indicate a location and a velocity parameter that are used as a reference value. Three values of B3 B4=00, B3 B4=01, B3 B4=10, B3 B4=11 may respectively indicate that one of location parameter x and Vx, location parameter y and Vy, and location parameter z and Vz is used as a reference value, and a fourth value may indicate that one of x and Vx, y and Vy, and z and Vz is used as a reference value or may be used for another application. When B1 indicates that the relative value is not used for the location and B2 also indicates that the relative value is not used for the velocity, B3 B4 is default or B3 B4 is used as a reserved field for another application.

It should be noted that when both the velocity and the location are represented by using relative representation, a combination manner of x and Vx, y and Vy, and z and Vz is direct, and complexity is low. However, a method for indicating a parameter of a reference value by B3 B4 may also be another combination. For example, three of B3 B4=00, B3 B4=01, B3 B4=10, B3 and B4=11 respectively represent the location parameters x and Vy, y and Vz, and z and Vx. This is not limited in this application. In addition, a sequence of B1, B2, B3, and B4 is not limited in this application.

In manner 3.7, two bits are used to separately indicate whether the location information and the velocity information use the relative value, and two more bits are used to indicate the parameter used as the reference value. Therefore, an indication manner of the location information and the velocity information can be more flexibly processed based on an actual quantity of bits occupied by the location information and the velocity information.

Manner 3.8: 16 possible values of four bits (B1 B2 B3 B4) indicate 16 cases, where for example, a relative value is not used, a location reference value is not used, a velocity reference value is not used, or a location reference value and a velocity reference value are not used.

For example, the 16 possible values of B1 B2 B3 B4 respectively indicate the following information:

| | | | |
|---|---|---|---|
| 0000: No relative value is used. | 0001: A reference value is x. | 0010: A reference value is y. | 0011: A reference value is z. |
| 0100: A reference value is Vx. | 0101: A reference value is Vy. | 0110: A reference value is Vz. | 0111: Reference values are x and Vy. |
| 1000: Reference values are x and Vy. | 1001: Reference values are x and Vz. | 1010: Reference values are y and Vx. | 1011: Reference values are y and Vy. |
| 1100: Reference values are y and Vz. | 1101: Reference values are z and Vx. | 1110: Reference values are z and Vy. | 1111: Reference values are z and Vz. |

The reference value x implicitly indicates that a relative value is used only for the location information; the reference value Vz implicitly indicates that a relative value is used only for the velocity information; and the reference value x Vy implicitly indicates that relative values are used for both the location information and the velocity information.

It should be noted that, in addition to the foregoing examples, there may be a plurality of other possibilities for reference values corresponding to different values of B1 B2 B3 B4. This is not limited in this application.

In Manner 3.8, four bits are used to indicate selection of a reference value when relative representation is not used, a location is represented by relative representation, a velocity is represented by relative representation, and both a location and a velocity are represented by relative representation. The network device can flexibly select a location indication and a velocity indication based on actual values of the location and the velocity.

In the foregoing example manner, at least a default manner is used, and a maximum of four bits are used to indicate an indication manner of the location information and the velocity information and a used reference value. In comparison with the prior art in which actual values of all parameters are sent, reference overheads are greatly reduced.

It should be noted that, in addition to the foregoing eight manners, there is another possible embodiment of the indication manner in which the third indication information includes the location information and the velocity information. This is not limited in this application.

In the wireless communication method shown in FIG. 8, the network side indicates the location information and the velocity information of the satellite to the terminal by using a reference value and a relative value. When a difference between the location parameters is small and/or a difference between the velocity parameters is small, a quantity of bits that need to be occupied in this representation manner is small, and overheads of indication signaling are reduced. Considering that difference values between parameters vary when the satellite is at different locations, the third indication information is used to indicate an indication manner of the location and the velocity in the ephemeris information, and the indication manner may be flexibly processed based on an actual location. On this basis, with reference to the indication manners of the default parameter shown in FIG. 4 and FIG. 5, indication overheads may be further reduced.

In addition to the foregoing possible manners, an embodiment of this application further provides a method, to reduce indication overheads.

For different cells, a possible area of a service satellite over the cells is limited. It is assumed that different cells have a specific range of corresponding locations, and parameters may be quantized within the corresponding range. For example, it is assumed that a value of x corresponding to a cell ranges from 0 to 160 km. Location information may be indicated by using four bits, to be specific, 0000 indicates x=0, 0001 indicates x=10, 0010 indicates x=20, and so on. It is assumed that a value of x of a cell ranges from 160 to 320. For the same four bits, 0000 indicates x=160, 0001 indicates x=170, and so on. In this way, the location information indicated by the satellite may be limited to a specific range, so as to reduce overheads.

In a possible embodiment, the terminal determines a location range in a cell based on an identifier of the cell.

In another possible embodiment, the terminal may determine the location range based on an orbit height according to an orbit height limit range of the satellite.

In still another possible embodiment, the location range of the satellite may be determined by using an explicit indication. For example, as shown in Table 4A, two bits are used to represent a location range; or as shown in Table 4B, two bits are used to represent a reference value of a location.

TABLE 4A

| Indication bits | Location range |
| --- | --- |
| 00 | 0-200 km |
| 01 | 200-400 km |
| 10 | 400-600 km |
| 11 | 600-800 km |

TABLE 4B

| Indication bits | Reference value |
| --- | --- |
| 00 | 200 km |
| 01 | 400 km |
| 10 | 600 km |
| 11 | 800 km |

For each parameter that needs to be indicated, a range indication bit is introduced. For example, when a range indication bit corresponding to x is 00, it indicates that a range of x is 0 to 200 km. The foregoing method can reduce indication overheads. On the other side, assuming that a quantity of bits reserved for data is k, quantization precision of the data is $200/2^k$. When indication overheads remain unchanged, quantization precision indicated by the data may be improved. Different parameters may correspond to different tables, or may correspond to a same table.

It should be noted that a quantity of indication bits and a corresponding value are not limited in this application. Values shown in Table 4A and Table 4B are merely examples.

In particular, the solution in Table 4B may also be applicable to a reference value indicating a velocity.

The method may be combined with any one of the foregoing possible embodiments. For example, a value x is default in the first ephemeris information. In this case, for indications of parameters y and z, specific values may be determined based on an indication range and an indication bit, to reduce signaling overheads and improve precision of indication data.

To implement functions in the foregoing methods provided in embodiments of this application, the network device and the terminal device may include a hardware structure and/or a software module, and implement the foregoing functions in a form of the hardware structure, the software module, or a combination of the hardware structure and the software module. Whether a specific function in the foregoing functions is performed by using the hardware structure, the software module, or the combination of the hardware structure and the software module depends on particular applications and design constraints of the technical solutions.

Figure 9:
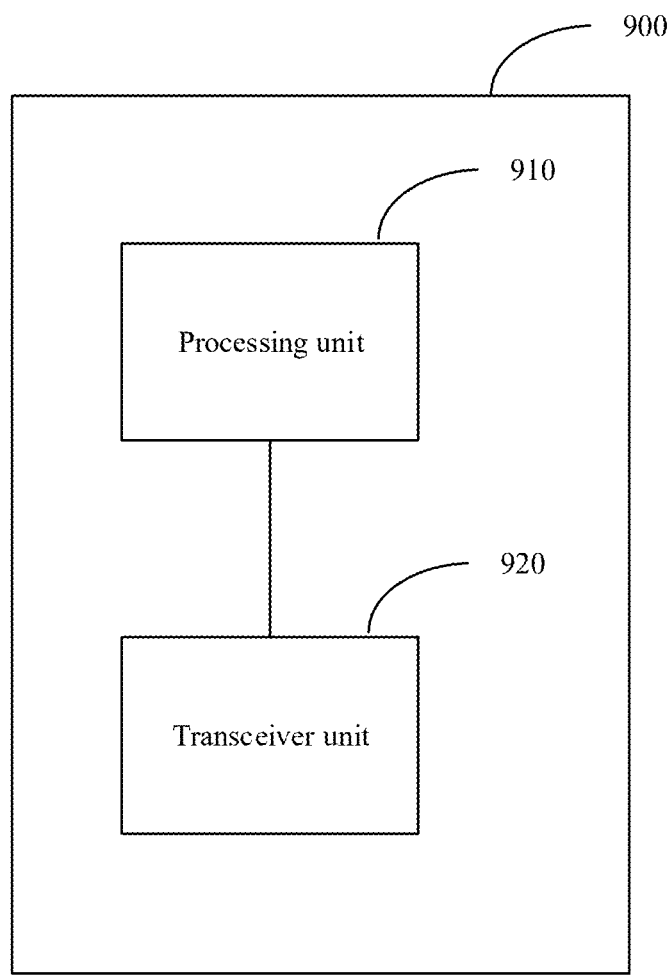
FIG. 9 is a schematic diagram of a communication apparatus according to an embodiment of this application.

As shown in FIG. 9, according to a same technical concept, an embodiment of this application further provides a communication apparatus 900. The communication apparatus 900 may be a terminal or a network device, namely, a first communication apparatus or a second communication apparatus, may be an apparatus in a terminal device or a network device, or may be an apparatus that can be used with a terminal device and a network device. In a possible embodiment, the communication apparatus 900 may include modules or units that are in a one-to-one correspondence with the methods/operations/steps/actions performed by the terminal in the foregoing method embodiments. The units may be hardware circuits or software, or may be implemented by the hardware circuit in combination with the software. In a possible embodiment, the communication apparatus 900 may include a processing unit 910 and a transceiver unit 920. The processing unit 910 may be configured to invoke the transceiver unit 920 to perform a receiving and/or sending function.

When the communication apparatus 900 is configured to execute the operations executed by the terminal, namely, the first communication apparatus, the transceiver unit 920 is configured to obtain first ephemeris information of the second communication apparatus, where the first ephemeris information includes information about m parameters of n parameters in second ephemeris information, n is equal to 6, and m is a positive integer less than n, and the n parameters include a first location parameter 1, a first location parameter 2, and a first location parameter 3 in the first location information, and a first velocity parameter 1, a first velocity parameter 2, and a first velocity parameter 3 in first velocity information. The processing unit 910 is configured to determine values of the n parameters in the second ephemeris information based on the first ephemeris information, where the values of the n parameters include values of the m parameters and values of remaining n-m parameters. The transceiver unit 920 is further configured to communicate with the second communication apparatus based on the second ephemeris information.

In a possible embodiment, n-m=1. The processing unit 910 is configured to: when the remaining n-m parameters in the second ephemeris information are default location parameter in the first location information, obtain a value of the default location parameter based on the first location information and the first velocity information in the first ephemeris information according to the law of universal gravitation; or when the remaining n-m parameters in the second ephemeris information are default velocity parameters in the first velocity information, obtain, by the first communication apparatus, a value of the default velocity parameter based on the first location information and the first velocity information in the first ephemeris information according to the law of universal gravitation.

In a possible embodiment, the processing unit 910 is further configured to: obtain first indication information, where the first indication information indicates information about the remaining n-m default parameters in the first ephemeris information; and determine the values of the n parameters in the second ephemeris information based on the first indication information and the first ephemeris information.

When the communication apparatus 900 is configured to execute the operations executed by the network device, namely, the second communication apparatus, the processing unit 910 is configured to determine the first ephemeris information, where the first ephemeris information includes information about m parameters of n parameters in second ephemeris information, n is equal to 6, and m is a positive integer less than n. The n parameters include the first location parameter 1, the first location parameter 2, and the first location parameter 3 in the first location information, and the first velocity parameter 1, the first velocity parameter 2, and the first velocity parameter 3 in the first velocity information. The transceiver unit 920 is configured to send the first ephemeris information values to the first communication apparatus, where the first ephemeris information is used to determine the values of n parameters in the second ephemeris information, and the values of n parameters include the values of the m parameters and the values of remaining n-m parameters.

The transceiver unit 920 is further configured to perform other receiving or sending steps or operations performed by the terminal or the network device in the foregoing method embodiments. The processing unit 910 may be further configured to perform corresponding steps or operations, other than receiving and sending, performed by the terminal and the network device in the foregoing method embodiments. Details are not described herein again.

Division into modules in embodiments of this application is an example, and is merely division into logical functions. There may be other division during actual embodiment. In addition, functional modules in embodiments of this application may be integrated into one processor, or each of the modules may physically and separately exist, or two or more modules are integrated into one module. The integrated modules or units may be implemented in a form of hardware, or may be implemented in a form of a software functional module.

Figure 10:
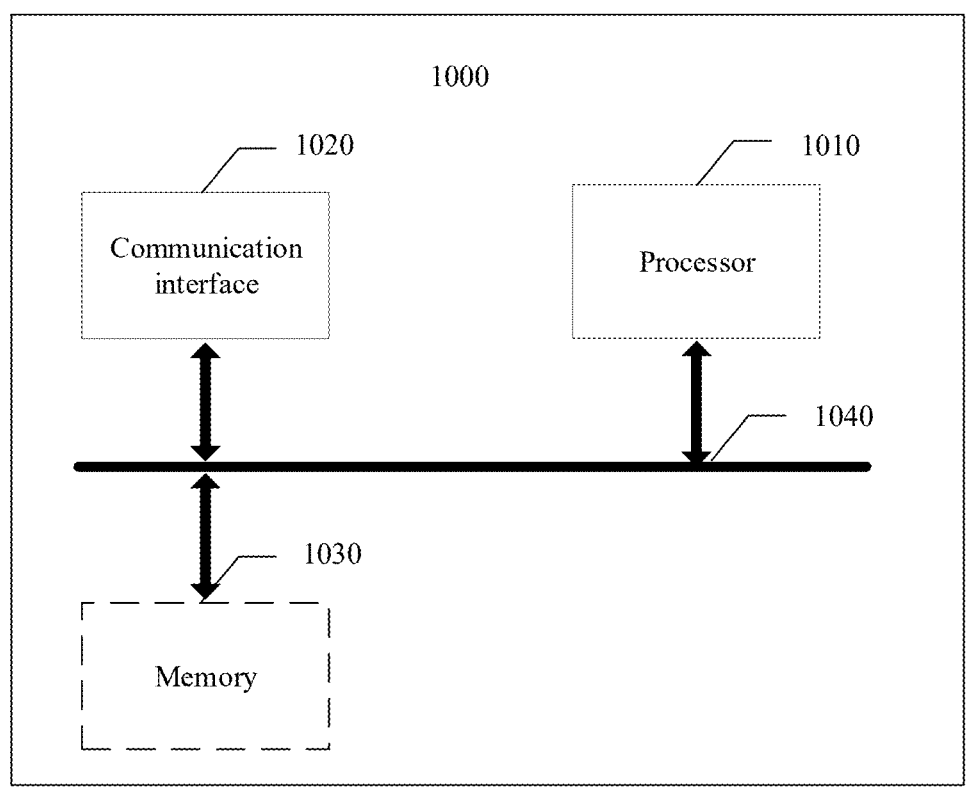
FIG. 10 is a schematic diagram of another communication apparatus according to an embodiment of this application.

Refer to FIG. 10. An embodiment of this application further provides a communication apparatus 1000, configured to implement functions of the terminal and the network device in the foregoing method, namely, functions of the first communication apparatus and the second communication apparatus. The communication apparatus may be a terminal or a network device, an apparatus in a terminal or a network device, or an apparatus that can be used together with a terminal or a network device. The communication apparatus 1000 may be a chip system. In this embodiment of this application, the chip system may include a chip, or may include a chip and another discrete component. The communication apparatus 1000 includes at least one processor 1010, configured to implement the functions of the terminal or the network device in the method provided in embodiments of this application. The communication apparatus 1000 may further include a communication interface 1020. In embodiments of this application, the communication interface may be a transceiver, a circuit, a bus, a module, or a communication interface of another type, and is configured to communicate with another device via a transmission medium. For example, the communication interface 1020 is used for an apparatus in the communication apparatus 1000 to communicate with another device.

The processor 1010 may perform functions performed by the processing unit 910 in the communication apparatus 900, and the communication interface 1020 may be configured to perform functions performed by the transceiver unit 920 in the communication apparatus 900.

When the communication apparatus 1000 is configured to execute the operations executed by the terminal, namely, the first communication apparatus, the processor 1010 is configured to obtain first ephemeris information of the second communication apparatus, where the first ephemeris information includes information about m parameters of n parameters in second ephemeris information, n is equal to 6, and m is a positive integer less than n, and the n parameters include a first location parameter 1, a first location parameter 2, and a first location parameter 3 in the first location information, and a first velocity parameter 1, a first velocity parameter 2, and a first velocity parameter 3 in first velocity information. The processor 1010 is further configured to determine values of the n parameters in the second ephemeris information based on the first ephemeris information, where the values of the n parameters include values of the m parameters and values of remaining n-m parameters. The communication interface 1020 is further configured to communicate with the second communication apparatus based on the second ephemeris information.

When the communication apparatus 1000 is configured to execute the operations executed by the network device, a processor 1010 is configured to determine the first ephemeris information, where the first ephemeris information includes the information about m parameters of n parameters in the second ephemeris information, n is equal to 6, and m is a positive integer less than n, and the n parameters include the first location parameter 1, the first location parameter 2, and the first location parameter 3 in the first location information, and the first velocity parameter 1, the first velocity parameter 2, and the first velocity parameter 3 in the first velocity information. The communication interface 1020 is configured to send the first ephemeris information values to the first communication apparatus, where the first ephemeris information is used to determine the values of n parameters in the second ephemeris information, and the values of n parameters include values of the m parameters and values of remaining n-m parameters.

The communication interface 1020 is further configured to perform other receiving or sending steps or operations performed by the terminal or the network device in the foregoing method embodiments. The processor 1010 may be further configured to perform corresponding steps or operations, other than receiving and sending, performed by the terminal and the network device in the foregoing method embodiments. Details are not described herein again.

The communication apparatus 1000 may further include at least one memory 1030, configured to store program instructions and/or data. The memory 1030 is coupled to the processor 1010. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1010 may execute the program instructions stored in the memory 1030. In a possible embodiment, at least one of the at least one memory may be integrated with the processor. In another possible embodiment, the memory 1030 is located outside the communication apparatus 1000.

In this embodiment of this application, a specific connection medium between the communication interface 1020, the processor 1010, and the memory 1030 is not limited. In this embodiment of this application, the memory 1030, the processor 1010, and the communication interface 1020 are connected by using a bus 1040 in FIG. 10. The bus is represented by using a thick line in FIG. 10. A connection manner between other components is merely an example for description, and is not limited thereto. The bus may be classified into an address bus, a data bus, a control bus, or the like. For ease of representation, only one thick line is used to represent the bus in FIG. 10, but this does not mean that there is only one bus or only one type of bus.

In an embodiment of this application, the processor 1010 may be one or more central processing units (CPU). When the processor 1010 is one CPU, the CPU may be a single-core CPU or a multi-core CPU. The processor 1010 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The operations of the methods disclosed with reference to embodiments of this application may be directly implemented by a hardware processor, or may be implemented by a combination of hardware and a software module in a processor.

In an embodiment of this application, the memory 1030 may include but is not limited to a nonvolatile memory, for example, a hard disk drive (HDD) or a solid-state drive (SSD), a random access memory (RAM), an erasable programmable read-only memory (EPROM), a read-only memory (ROM), a compact disc read-only memory (CD-ROM), or the like. The memory is any other medium that may carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

Figure 11:
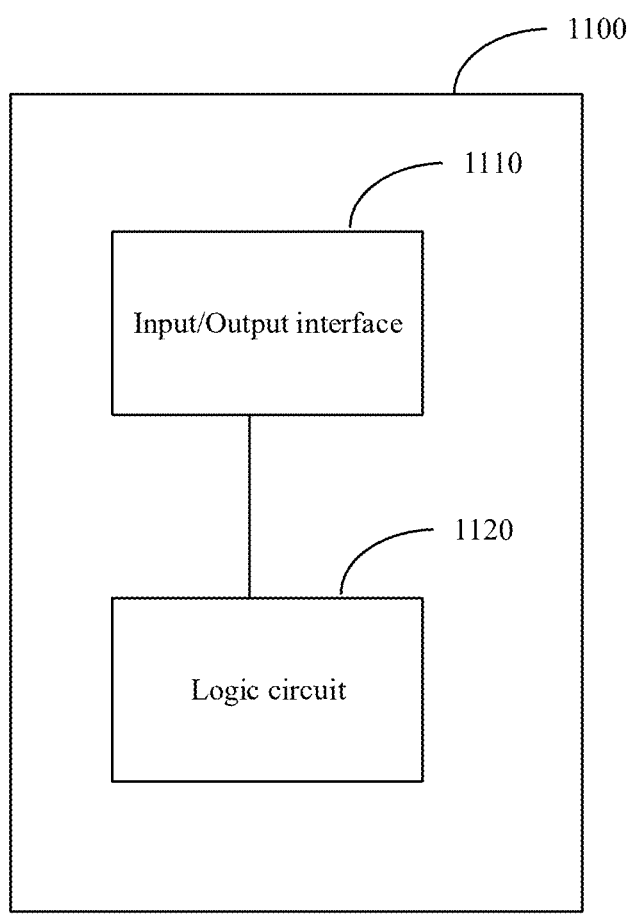
FIG. 11 is a schematic diagram of still another communication apparatus according to an embodiment of this application.

Refer to FIG. 11. An embodiment of this application further provides an apparatus 1100, configured to implement functions of the terminal and the network device in the foregoing method. The apparatus 1100 may be a communication apparatus or a chip in a communication apparatus. The communication apparatus includes:

at least one input/output interface 1110 and a logic circuit 1120. The input/output interface 1110 may be an input/output circuit, or may be referred to as a communication interface. The logic circuit 1120 may be a signal processor, a chip, or another integrated circuit that may implement the methods in this application.

The at least one input/output interface 1110 is configured to input or output a signal or data. For example, when the apparatus is a terminal or is used for a terminal, the input/output interface 1110 is configured to communicate with a second communication apparatus. For example, when the apparatus is a network device or is used for a network device, the input/output interface 1110 is configured to output first ephemeris information.

The logic circuit 1120 is configured to perform a part or all of the operations in any one of the methods provided in embodiments of this application. The logic circuit may implement the functions implemented by the processing unit 910 in the apparatus 900 and the processor 1010 in the apparatus 1000. For example, when the apparatus is a terminal or is applied to a terminal, the apparatus is configured to perform operations performed by the terminal (the first communication apparatus) in various possible embodiments of the foregoing method embodiments. For example, the logic circuit 1120 is configured to determine second ephemeris information based on the first ephemeris information. When the apparatus is a network device or is used for a network device, the apparatus is configured to perform the operations performed by the network device (the second communication apparatus) in the possible embodiment methods in the foregoing method embodiments. For example, the logic circuit 1120 is configured to determine the first ephemeris information.

When the communication apparatus is a chip applied to the terminal, the chip in the terminal implements the functions of the terminal device in the foregoing method embodiments. The chip in the terminal receives information from another module (for example, a radio frequency module or an antenna) in the terminal, where the information is sent by the network device to the terminal device. Alternatively, the chip in the terminal device sends information to another module (for example, a radio frequency module or an antenna) in the terminal device, where the information is sent by the terminal device to the network device.

When the communication apparatus is a chip applied to the network device, the chip in the network device implements functions of the network device in the foregoing method embodiments. The chip in the network device receives information from another module (for example, a radio frequency module or an antenna) in the network device, where the information is sent by the terminal to the network device. Alternatively, the chip in the network device sends information to another module (for example, a radio frequency module or an antenna) in the network device, where the information is sent by the network device to the terminal device.

Based on a same concept as the foregoing method embodiments, an embodiment of this application further provides a computer-readable storage medium. The computer-readable storage medium stores a computer program. The computer program is executed by hardware (for example, a processor), to implement a part or all of the operations in any one of the methods performed by any apparatus in embodiments of this application.

Based on a same concept as the foregoing method embodiments, an embodiment of this application further provides a computer program product including instructions. When the computer program product is run on a computer, the computer is enabled to perform a part or all of the operations in any one of the methods in the foregoing aspects.

Based on a same concept as the foregoing method embodiments, this application further provides a chip or a chip system. The chip may include a processor. The chip may further include a memory (or a storage module) and/or a transceiver (or a communication module), or the chip is coupled to a memory (or a storage module) and/or a transceiver (or a communication module). The transceiver (or the communication module) may be configured to support the chip in wired and/or wireless communication, and the memory (or the storage module) may be configured to store a program. The processor invokes the program to implement the operations performed by the terminal or the network device in any one of the foregoing method embodiments and the possible embodiments of the method embodiments. The chip system may include the chip, or may include the chip and another discrete component, such as a memory (or a storage module) and/or a transceiver (or a communication module).

Figure 2:
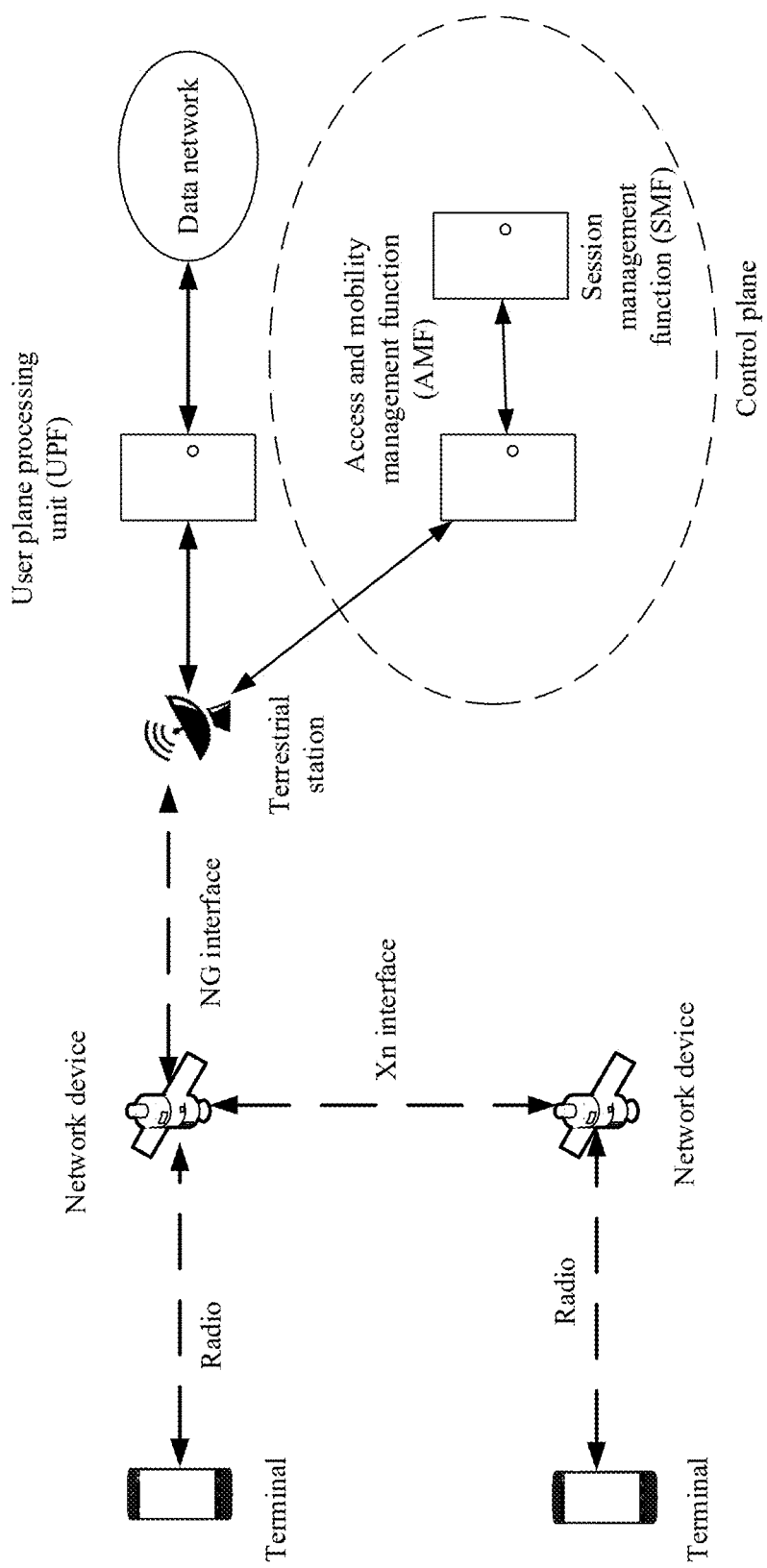
FIG. 2 is a schematic diagram of an application scenario according to an embodiment of this application.

Based on a same concept as the foregoing method embodiments, this application further provides a communication system. The communication system may include the foregoing terminal and/or the foregoing network device. The communication system may be configured to implement an operation performed by the terminal or the network device in any one of the foregoing method embodiments and the possible embodiments of the method embodiments. For example, the communication system may have a structure shown in FIG. 1 or FIG. 2.

All or some of the foregoing embodiments may be implemented by software, hardware, firmware, or any combination thereof. When software is used to implement embodiments, embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state disk), or the like. In the foregoing embodiments, a description of each embodiment has respective focuses. For a part that is not described in detail in an embodiment, refer to related description in another embodiment.

In the foregoing embodiments, a description of each embodiment has respective focuses. For a part that is not described in detail in an embodiment, refer to related description in another embodiment.

In the several embodiments provided in this application, it should be understood that the disclosed apparatuses may be implemented in other manners. For example, the described apparatus embodiment is merely an example. For example, division into the units is merely logical function division and may have another manner for division in actual embodiment. For example, a plurality of units or components may be combined or integrated into another system, or some features may be ignored or not performed. In addition, displayed or discussed mutual couplings or direct couplings or communication connections may be implemented through some interfaces. Indirect couplings or communication connections between apparatuses or units may be implemented in electronic or other forms.

When the integrated unit is implemented in a form of a software function unit and sold or used as an independent product, the integrated unit may be stored in a computer-readable storage medium. Based on such an understanding, the technical solutions of this application essentially, or the part contributing to conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods described in embodiments of this application.

The foregoing description is merely some specific embodiments of this application, but is not intended to limit the protection scope of this application. Any person skilled in the art may make changes and modifications to these embodiments within the technical scope disclosed in this application. Therefore, the following claims are intended to be construed as to cover the foregoing embodiments and to indicate all changes and modifications falling within the scope of this application. Therefore, the protection scope of this application shall be subject to protection scope of the claims.

What is claimed is:

1. A wireless communication method, comprising:
obtaining, by a first communication apparatus, first ephemeris information of a second communication apparatus, wherein the first ephemeris information comprises information about m parameters of n parameters in second ephemeris information, n is equal to 6, and m is a positive integer less than n, and the n parameters comprise a first location parameter, a first location parameter, and a first location parameter in first location information, and a first velocity parameter, a first velocity parameter, and a first velocity parameter in first velocity information; and
determining values of the n parameters in the second ephemeris information based on the first ephemeris information, wherein the values of the n parameters comprise values of the m parameters and values of remaining n−m parameters.

2. The method according to claim 1, wherein
the first location parameter, the first location parameter, and the first location parameter in the first location information are respectively location information on an x-axis, a y-axis, and a z-axis in an earth-centered, earth-fixed (ECEF) coordinate system; and
the first velocity parameter, the first velocity parameter, and the first velocity parameter in the first velocity information are respectively velocity information Vx, Vy, and Vz in the ECEF coordinate system.

3. The method according to claim 1, wherein n−m=1,
when the remaining n−m parameters in the second ephemeris information are default location parameters in the first location information, the first communication apparatus obtains a value of each default location parameter based on the first location information and the first velocity information in the first ephemeris information according to law of universal gravitation; or
when the remaining n−m parameters in the second ephemeris information are default velocity parameters in the first velocity information, the first communication apparatus obtains a value of each default velocity parameter based on the first location information and the first velocity information in the first ephemeris information according to the law of universal gravitation.

4. The method according to claim 1, wherein
the first communication apparatus further obtains first indication information about remaining n−m default parameters in the first ephemeris information; and
the first communication apparatus determines the values of the n parameters in the second ephemeris information based on the first indication information and the first ephemeris information.

5. The method according to claim 4, wherein n−m=1,
the first indication information indicates a default location parameter in the first ephemeris information and/or whether the default location parameter in the first ephemeris information is positive or negative, and the first communication apparatus obtains a value of the default location parameter based on the first indication information and the first ephemeris information according to law of universal gravitation; or
the first indication information indicates a default velocity parameter in the first ephemeris information and/or whether the default velocity parameter in the first ephemeris information is positive or negative, and the first communication apparatus obtains a value of the default velocity parameter based on the first indication information and the first ephemeris information according to the law of universal gravitation.

6. The method according to claim 1, wherein
the first location information in the m parameters comprised in the first ephemeris information is a difference value relative to a location of a first reference point; and
determining the values of the n parameters in the second ephemeris information based on the first ephemeris information comprises:
obtaining, by the first communication apparatus based on the first location information and location information of the first reference point, an actual value corresponding to the first location information in the m parameters, and
determining the values of the n parameters in the second ephemeris information based on the actual value corresponding to the first location information in the m parameters and the first velocity information in the m parameters.

7. The method according to claim 6, wherein
the first communication apparatus further obtains second indication information, wherein
the second indication information comprises the location information of the first reference point, and the actual value corresponding to the first location information is a value obtained based on a value of the location of the first reference point and the first location information comprised in the first ephemeris information; or
the second indication information comprises location information of a second reference point, and the actual value corresponding to the first location information is a value obtained based on a location of the second reference point, the first velocity information comprised in the first ephemeris information, and the first location information comprised in the first ephemeris information.

8. The method according to claim 1, wherein
one piece of first location parameter information in the first location information in the information about the m parameters comprised in the first ephemeris information is a location reference value, and another piece of first location parameter information is a location relative value based on the location reference value; and/or one piece of first velocity parameter information in the first velocity information in the m parameters comprised in the first ephemeris information is a velocity reference value and another piece of first velocity parameter information is a velocity relative value based on the velocity reference value; and
determining the values of n parameters in the second ephemeris information based on the first ephemeris information comprises:
determining, by the first communication apparatus based on the location reference value and the location relative value, an actual value corresponding to the first location information in the m parameters, and/or determining, based on the velocity reference value and the velocity relative value, the actual value corresponding to the first velocity information in the m parameters, and
determining the values of the n parameters in the second ephemeris information based on the actual value of the first location information in the m parameters and the actual value of the first velocity information in the m parameters.

9. The method according to claim 8, wherein
the first communication apparatus further obtains third indication information, wherein the third indication information comprises a location and/or velocity indication manner in the first ephemeris information; and
the first communication apparatus determines the values of the n parameters in the second ephemeris information based on the third indication information and the first ephemeris information.

10. The method according to claim 1, wherein a quantity of bits required by the n−m parameters is greater than or equal to a quantity of bits required by any one of the m parameters.

11. A wireless communication method, comprising:
determining, by a second communication apparatus, first ephemeris information, wherein the first ephemeris information comprises information about m parameters of n parameters in second ephemeris information, n is equal to 6, and m is a positive integer less than n, and the n parameters comprise a first location parameter, a first location parameter, and a first location parameter in first location information, and a first velocity parameter, a first velocity parameter, and a first velocity parameter in first velocity information; and
sending, by the second communication apparatus, the first ephemeris information to a first communication apparatus, wherein the first ephemeris information is used to determine values of the n parameters in the second ephemeris information, and the values of n parameters comprise values of the m parameters and values of remaining n−m parameters.

12. The method according to claim 11, wherein
the first location parameter, the first location parameter, and the first location parameter in the first location information are respectively location information on an x-axis, a y-axis, and a z-axis in an earth-centered, earth-fixed (ECEF) coordinate system; and
the first velocity parameter, the first velocity parameter, and the first velocity parameter in the first velocity information are respectively velocity information Vx, Vy, and Vz in the ECEF coordinate system.

13. The method according to claim 11, wherein
sending, by the second communication apparatus, first indication information to the first communication apparatus, wherein the first indication information indicates information about the remaining n−m default parameters in the first ephemeris information.

14. The method according to claim 13, wherein n−m=1,
the first indication information indicates a default location parameter in the first ephemeris information and/or whether the default location parameter in the first ephemeris information is positive or negative; or
the first indication information indicates a default velocity parameter in the first ephemeris information and/or whether the default velocity parameter in the first ephemeris information is positive or negative.

15. The method according to claim 11, wherein
the first location information in the m parameters comprised in the first ephemeris information is a difference value relative to a location of a first reference point.

16. The method according to claim 15, further comprising:
sending, by the second communication apparatus, second indication information to the first communication apparatus, wherein
the second indication information comprises location information of the first reference point, and the location information of the first reference point is location information of a space reference point; or the second indication information comprises location information of a second reference point, and the location information of the second reference point is location information of a ground reference point.

17. The method according to claim 11, wherein
one piece of first location parameter information in the first location information in the information about the m parameters comprised in the first ephemeris information is a location reference value, and another piece of first location parameter information is a location relative value based on the location reference value; and/or
one piece of first velocity parameter information in the first velocity information in the m parameters comprised in the first ephemeris information is a velocity reference value and another piece of first velocity parameter information is a velocity relative value based on the velocity reference value.

18. The method according to claim 17, further comprising:
sending, by the second communication apparatus, third indication information to the first communication apparatus, wherein the third indication information comprises a location and/or velocity indication manner in the first ephemeris information.

19. The method according to claim 11, wherein a quantity of bits required by the n−m parameters is greater than or equal to a quantity of bits required by any one of the m parameters.

20. A communication apparatus, comprising:
a transceiver configured to obtain first ephemeris information of a second communication apparatus, wherein the first ephemeris information comprises information about m parameters of n parameters in second ephemeris information, n is equal to 6, and m is a positive integer less than n, and the n parameters comprise a first location parameter, a first location parameter, and a first location parameter in first location information, and a first velocity parameter, a first velocity parameter, and a first velocity parameter in first velocity information;
a processor configured to determine values of the n parameters in the second ephemeris information based on the first ephemeris information, wherein the values of the n parameters comprise values of the m parameters and values of remaining n−m parameters; and
the transceiver further configured to communicate with the second communication apparatus based on the second ephemeris information.

* * * * *